US010119035B2

(12) United States Patent
Wynne et al.

(10) Patent No.: US 10,119,035 B2
(45) Date of Patent: Nov. 6, 2018

(54) ABHESIVE COATINGS

(75) Inventors: Kenneth J. Wynne, Midlothian, VA (US); Wei Zhang, Henrico, VA (US); Chenyu Wang, Richmond, VA (US); Souvik Chakrabarty, Richmond, VA (US)

(73) Assignee: VIRGINIA COMMONWEALTH UNIVERSITY, Richmond, VA (US)

( * ) Notice: Subject to any disclaimer, the term of this patent is extended or adjusted under 35 U.S.C. 154(b) by 1291 days.

(21) Appl. No.: 14/235,447

(22) PCT Filed: Jul. 26, 2012

(86) PCT No.: PCT/US2012/048425
§ 371 (c)(1),
(2), (4) Date: May 27, 2014

(87) PCT Pub. No.: WO2013/016594
PCT Pub. Date: Jan. 31, 2013

(65) Prior Publication Data
US 2014/0302267 A1    Oct. 9, 2014

Related U.S. Application Data

(60) Provisional application No. 61/457,977, filed on Jul. 26, 2011.

(51) Int. Cl.
*C09D 5/16* (2006.01)
*C09D 175/04* (2006.01)
(Continued)

(52) U.S. Cl.
CPC ....... *C09D 5/1662* (2013.01); *C08G 18/5015* (2013.01); *C08G 18/6674* (2013.01);
(Continued)

(58) Field of Classification Search
CPC .......... C09D 5/1662; C09D 175/04; C08G 18/5015; C08G 18/6674; C08G 18/718;
(Continued)

(56) References Cited

U.S. PATENT DOCUMENTS 6,891,013 B1 * 5/2005 Malik ................. C07D 305/06
528/402
2004/0242804 A1   12/2004 Medsker
(Continued)

FOREIGN PATENT DOCUMENTS

WO    2008/141323    11/2008

OTHER PUBLICATIONS

Mar. 14, 2006, Jason C. Yarbrough, "Contact Angle Analysis, Surface Dynamics, and Biofouling Characteristics of Cross-Linkable, Random Perfluoropolyether-Based Graft Terpolymers", Macromolecules 2006, 39, 2521-2528, 2006 American Chemical Society.
(Continued)

*Primary Examiner* — Ling Siu Choi
*Assistant Examiner* — Ronald Grinsted
(74) *Attorney, Agent, or Firm* — Neifeld IP Law, PC

(57) ABSTRACT

A monolithic, self-stratifying polymer coating, comprising: inner and outer-most surfaces on opposite sides of the coating, the inner surface being in contact with and adhered to an article; a surface region, extending from the outermost surface to a depth of about 2 nm from the outermost surface; a middle region, extending from a depth of about 2 nm from the outermost surface to a depth of less than about 2000 nm from the outermost surface; and a bulk region, extending from a depth of less than about 2000 nm from the outermost surface to the inner surface; wherein the surface region comprises a fluorous polyoxetane having the formula: (I)
(Continued)

(3FOx-*b*-ME2Ox)-75:25-4,7-UUr-Si(8) coating synthesis procedure wherein n is an integer of 0-11, and m is an integer>0, in a greater concentration relative to the middle and bulk regions; wherein the middle region comprises 3F-SiO$_{1.5}$ groups in a greater concentration relative to the surface and bulk regions; and wherein the bulk region comprises a polyurethane in a greater concentration relative to the surface and middle regions.

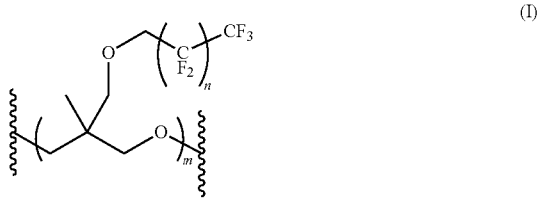

(I)

30 Claims, 15 Drawing Sheets

(51) Int. Cl.
C08G 18/50 (2006.01)
C08G 18/66 (2006.01)
C08G 18/71 (2006.01)
C08G 18/75 (2006.01)
C08G 65/18 (2006.01)
C08G 65/22 (2006.01)

(52) U.S. Cl.
CPC ......... *C08G 18/718* (2013.01); *C08G 18/758* (2013.01); *C08G 65/18* (2013.01); *C08G 65/226* (2013.01); *C09D 175/04* (2013.01); *Y10T 428/1393* (2015.01); *Y10T 428/31551* (2015.04)

(58) Field of Classification Search
CPC .... C08G 18/758; C08G 65/18; C08G 65/226; Y10T 428/1393; Y10T 428/31551
USPC ...................................... 428/36.91
See application file for complete search history.

(56) References Cited

U.S. PATENT DOCUMENTS

2005/0084683 A1* 4/2005 Wynne ............... C08G 18/3218
428/421
2009/0054577 A1 2/2009 Uchida

OTHER PUBLICATIONS

Umit Makal, "Ring opening polymerization of 3-semifluoro- and 3-bromomethyloxetanes to poly(2,2-substituted-1,3-propylene oxide) telechelics for soft blocks in polyurethanes", Polymer 46 (2005) 2522-2530, Science Direct, Elsevier.
Nov. 25, 2004, Kaoru Adachi, "Synthesis of Organic-Inorganic Polymer Hybrids Controlled by Diels-Alder Reaction", Macromolecules 2004, 37, 9793-9797, 2004 American Chemical Society.
Nov. 30, 2007, Pinar Kurt, "Co-Polyoxetanes with Alkylammonium and Fluorous or PEG-Like Side Chains: Soft Blocks for Surface Modifying Polyurethanes", Macromolecules 2007, 40, 9537-9543, 2007 American Chemical Society.
Apr. 14, 2009, Junghwan Shin, "Segmented Polythiourethane Elastomers through Sequential Thiol-Ene and Thiol-Isocyanate Reactions", Macromolecules 2009, 42, 3294-3301, 2009 American Chemical Society.
Yu-Seung Kim, "Surface properties of fluorinated oxetane polyol modified polyurethane block copolymers", Polymer 43 (2002) 7161-7170, Elsevier.
Oct. 12, 2004, Tomoko Fujiwara, "Contrasting Nanoscale Surface Morphologies of Polyurethanes Containing Polyoxetane Soft Blocks with Random and Block Segmer Sequences", Macromolecules 2004, 37, 8491-8494, 2004 American Chemical Society.
Kenneth J. Wynne, "Surface Science and Stability of Networks Prepared from Hydroxy-Terminated Polydimethylsiloxane and Methyltriethoxysilane", Appl. Organometal. Chem. 12, 763-770 (1998), 1998 John Wiley & Sons, Ltd.
Oct. 15, 2010, Adam J. Meuler, "Relationships Water Wettability and Ice Adhesion", vol. 2, No. 11, 3100-3110, 2010, 2010 American Chemical Society.
Apr. 1, 2010, Daewon Park, "Amphiphilic Surface Active Triblock Copolymers with Mixed Hydrophobic and Hydrophilic Side Chains for Tuned Marine Fouling-Release Properties", Langmuir 2010, 26(12), 9772-9781, 2010 American Chemical Society.
Gustavo Darrigran, "An Evaluation Pattern for Antimacrofouling Procedures: Limnoperna fortunei Larvae Study in a Hydroelectric Power Plant in South America", Ambio vol. 36, No. 7, Nov. 2007, Royal Swedish Academy of Sciences 2007.
Sep. 2008, D.C. Aldridge, "Density-dependent effects of a new invasive false mussel, *Mytilopsis trautwineana* (Tryon 1866), on shrimp, *Litopenaeus vannamei* (Boone 1931), aquaculture in Colombia", Aquaculture 281 (2008) 34-42, 2008 Elsevier B.V.
Jan. 1995, S. M. Evans, "Tributyltin Pollution: A Diminishing Problem Following Legislation Limiting the Use of TBT-Based Anti-fouling Paints", Marine Pollution Bulletin, vol. 30, No. 1, pp. 14-21, 1995, Elsevier Science Ltd.
Jan. 2010, Alistair A. Finnie, "Paint and Coatings Technology for the Control of Marine Fouling", Biofouling, ISBN: 978-1-405-16926-4, pp. 185-206, 2010 Blackwell Publishing Ltd.
Nov. 26, 2010, Siang Chen Wu, "Correlation between fouling propensity of soluble extracellular polymeric substances and sludge metabolic activity altered by different starvation conditions" Bioresource Technology 102 (2011) 5375-5380, 2010 Elsevier Ltd.
Sep. 24, 2010, Pierre Le-Clech, "Membrane bioreactors and their uses in wastewater treatments", Appl Microbiol Biotechnol (2010) 88:1253-1260, Springer-Verlag 2010.
Jun. 14, 2012, Wei Zhang, "A Polyurethane Surface Modifier: Contrasting Amphiphilic and Contraphilic Surfaces Driven by Block and Random Soft Blocks Having Trifluoroethoxymethyl and PEG Side Chains", Macromolecular Chemistry and Physics, (2012) 213:1415-1434, Wiley-VCH, DOI: 10.1002/macp.201200075.
Apr. 19, 2012, Wei Zhang, "Liquid-Liquid Extraction of 3FOx and 5FOx Polyoxetane Diols: Impact on Polyurethane Mechanical Properties, Surface Morphology, and Wetting Behavior", Macromolecular Chemistry and Physics, (2012) 213:1225-1238, Wiley-VCH, DOI: 10.1002/macp.201200053.
Apr. 25, 2013, International Search Report for WO 2013/016594.
Jan. 28, 2014, International Preliminary Report on Patentability for PCTUS2012048425.

* cited by examiner

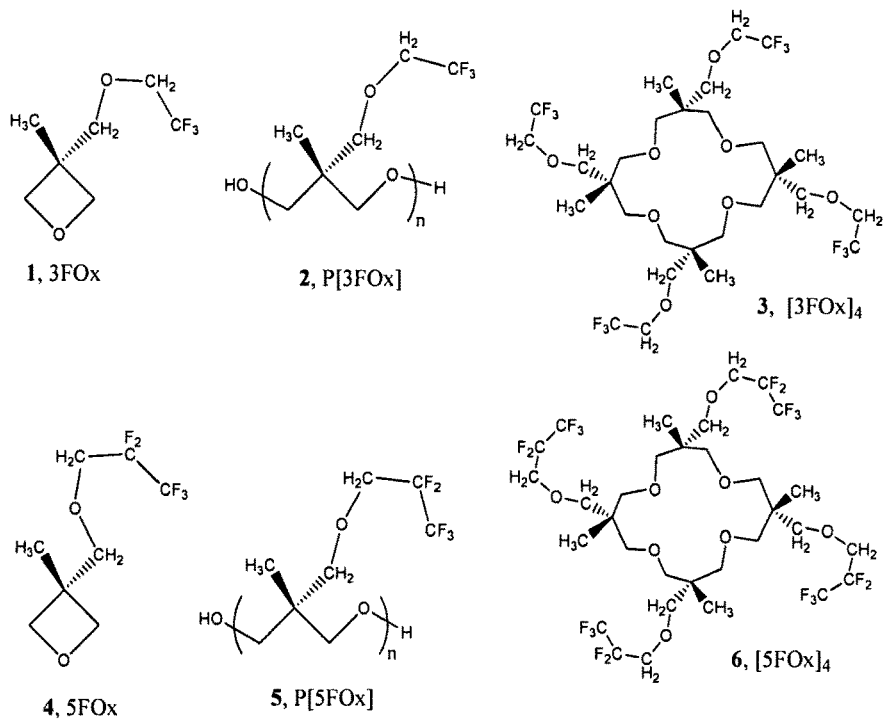
Figure 1. Structures for 3FOx and 5FOx oxetanes.
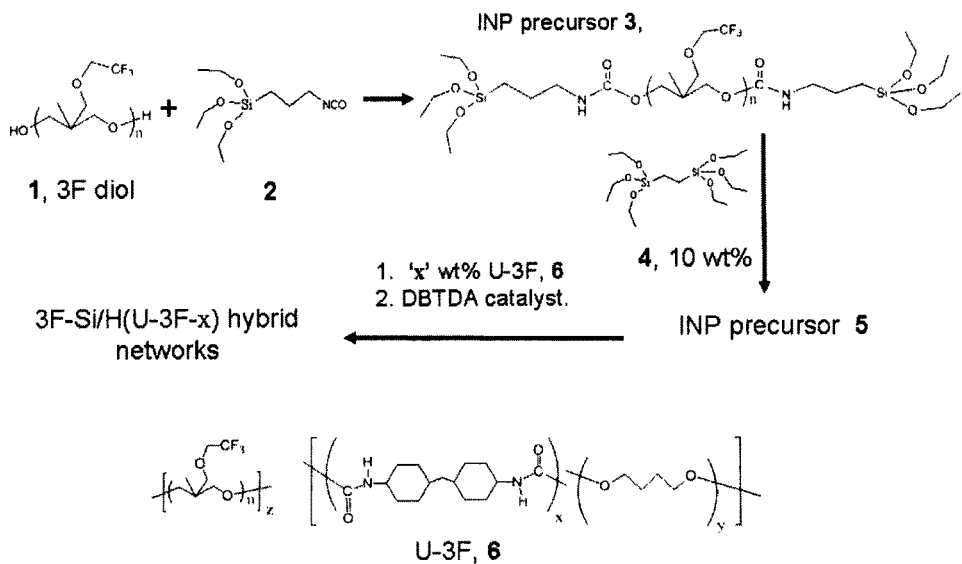
Figure 2. Preparation of the 3F-Si/H(U-3F-x) hybrid network coatings.

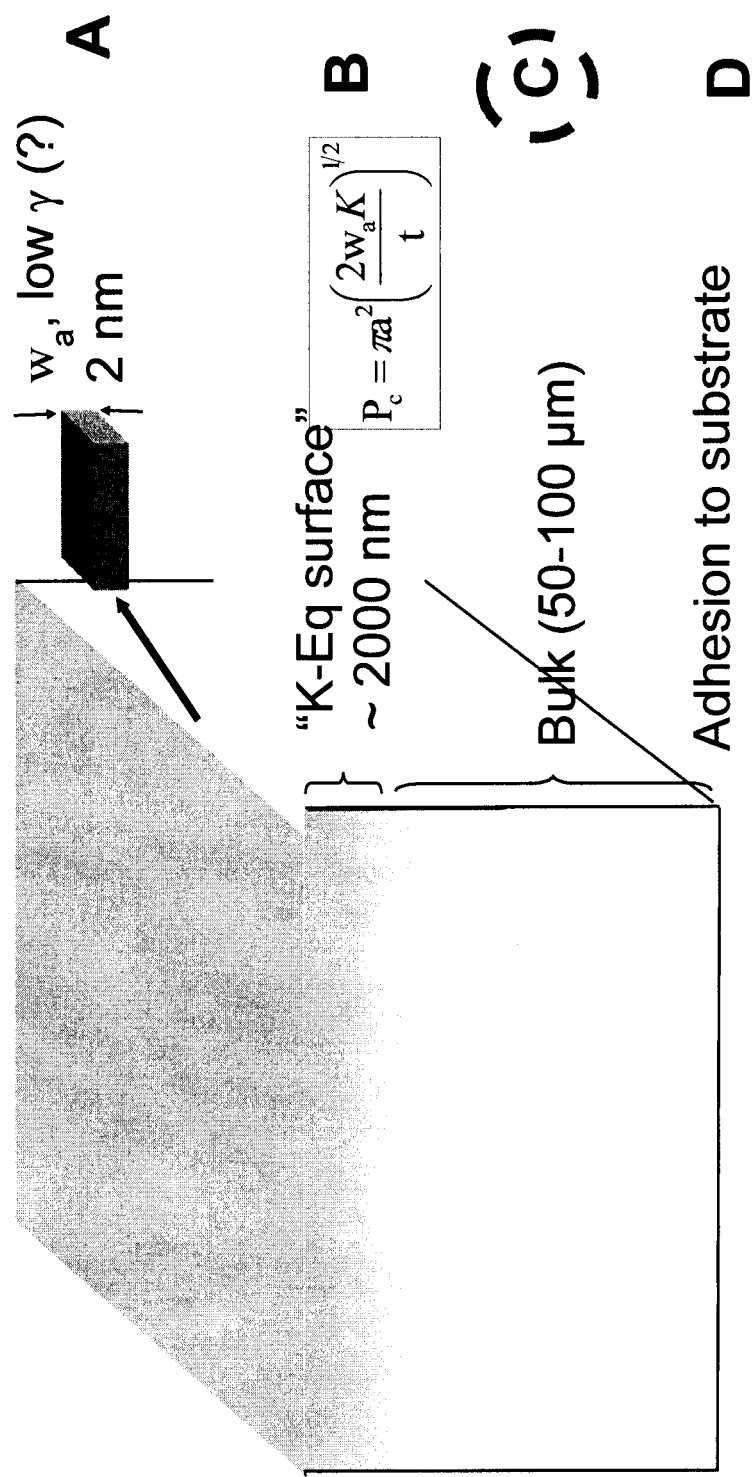
Figure 3. A nanoscale, microscale and mesoscale model for abhesive coatings based on physical principles.

Figure 4 3FOx Ring Opening Polymerization
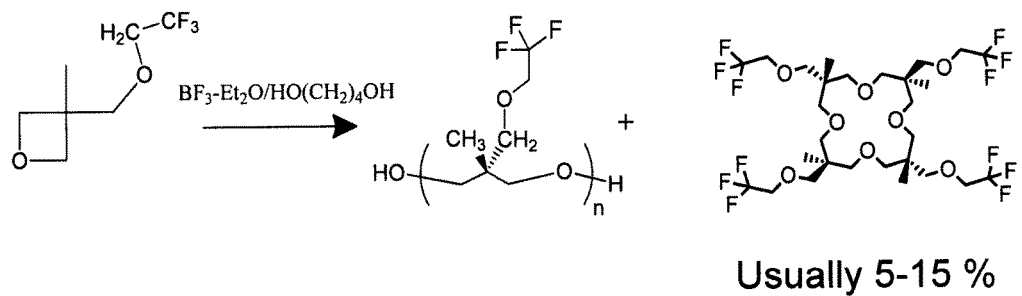
Usually 5-15 %

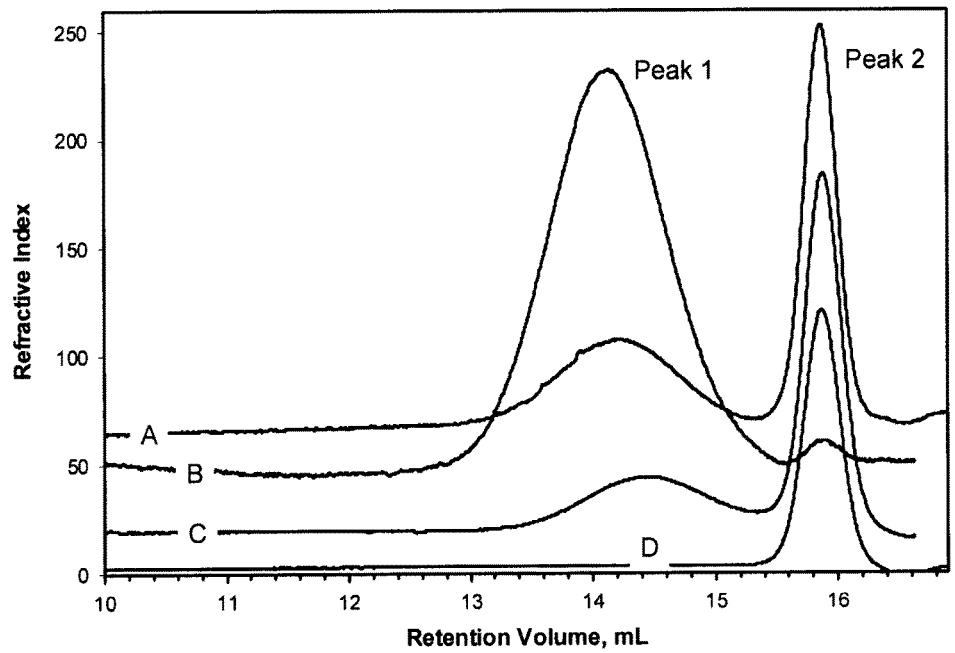
Figure 5. GPC for: A, as received P[3FOx-Cl]; B, P[3FOx-Cl-4.5]; C, 3FOx-Cl-TL; D, P[3FOx]$_4$ from sublimation of 3FOx-Cl-TL.
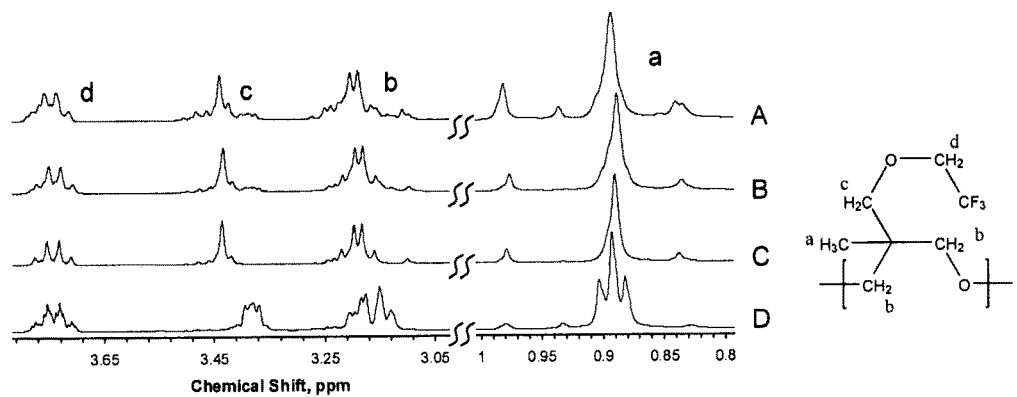
Figure 6. $^1$H-NMR for: A, 3FOx-Cl-TL; B, as received P[3FOx-Cl]; C. P[3FOx-Cl-4.5]; D. [3FOx]$_4$ from sublimation of 3FOx-Cl-TL.

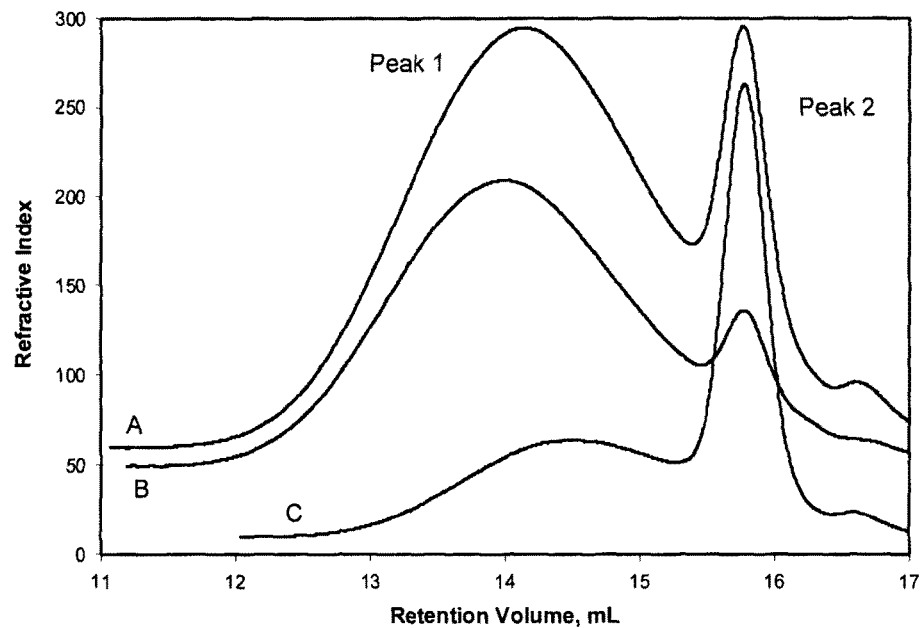
Figure 7. GPC for: A, as prepared P[5FOx-S1]; B, P[5FOx-S1-5]; C, 5FOx-S1-TL.
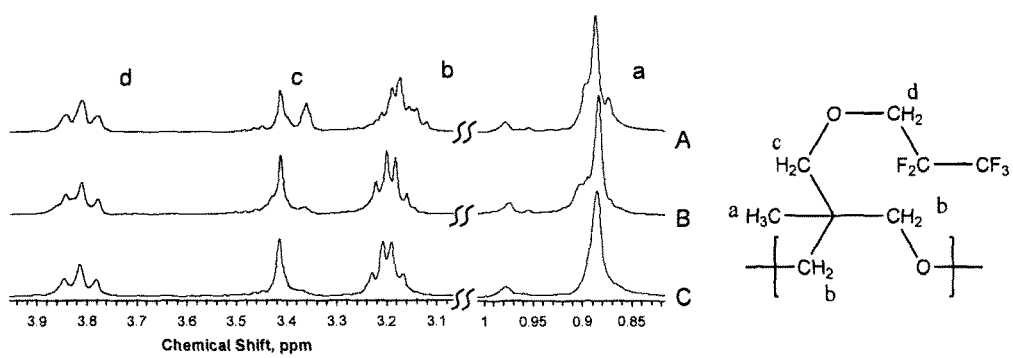
Figure 8. $^1$H-NMR for: A, 5FOx-S1-TL; B, as prepared P[5FOx-S1]; C, P[5FOx-S1-5].

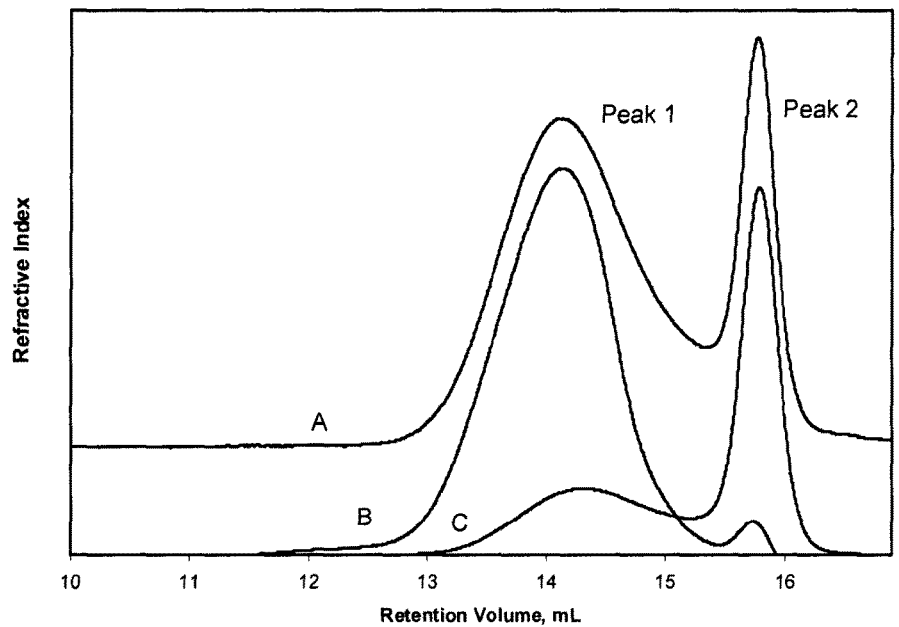
Figure 9. GPC for: A, as received P[5FOx-C1]; B, P[5FOx-C1-5.2]; C, 5FOx-C1-TL.
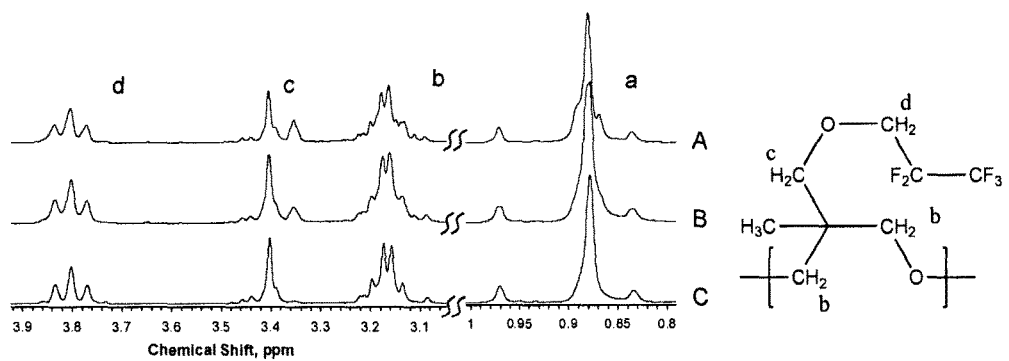
Figure 10. $^1$H-NMR spectra for: A, 5FOx-C1-TL; B, as received P[5FOx-C1]; C, P[5FOx-C1-5.2].

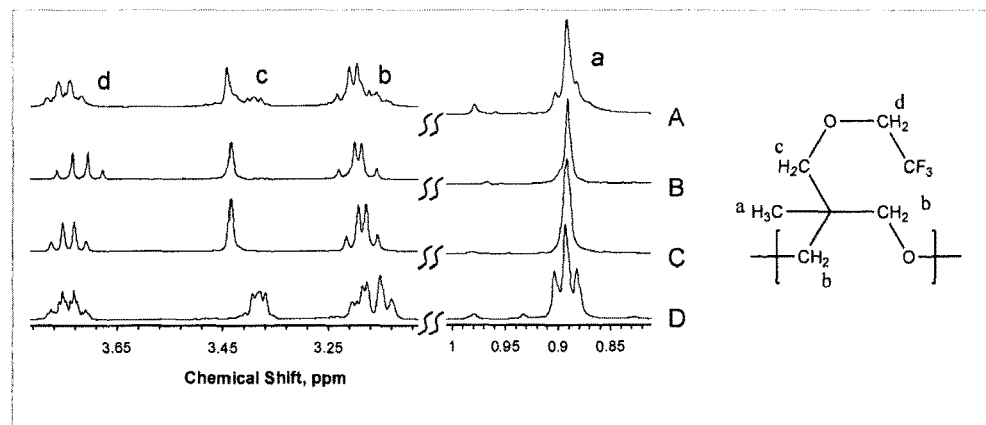
Figure 11. $^1$H-NMR for: A, 3FOx-S1-TL; B, P[3FOx-S1]; C. P[3FOx-S1-11]; D. [3FOx]4 from sublimation of 3FOx-S1-TL.
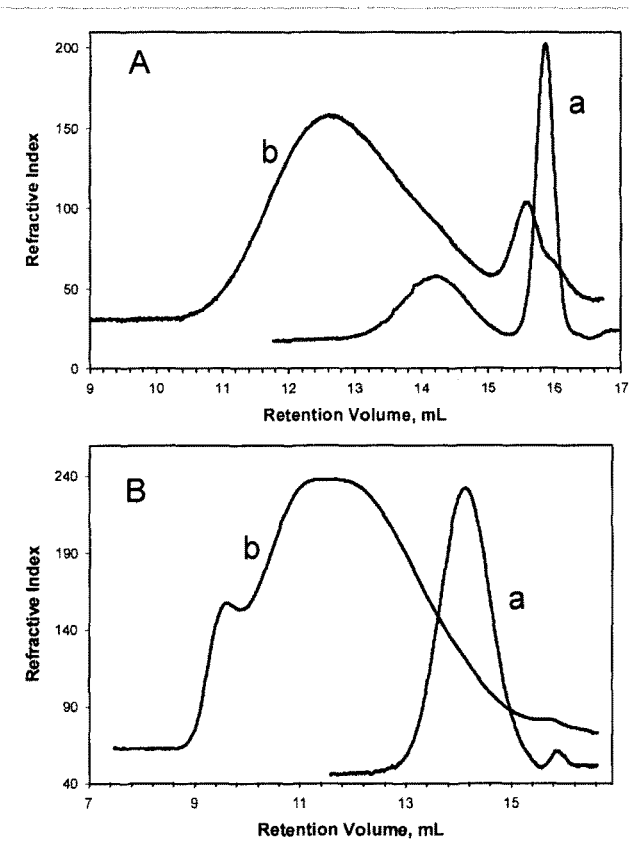
Figure 12. GPC for: A, (a) as received P[3FOx-C1] and (b) HMDI-BD(30)/P[3FOx-C1]; B. (a) P[3FOx-C1-4.5] and (b) HMDI-BD(30)/P[3FOx-C1-4.5]. Both polyurethanes were purified by two reprecipitations.

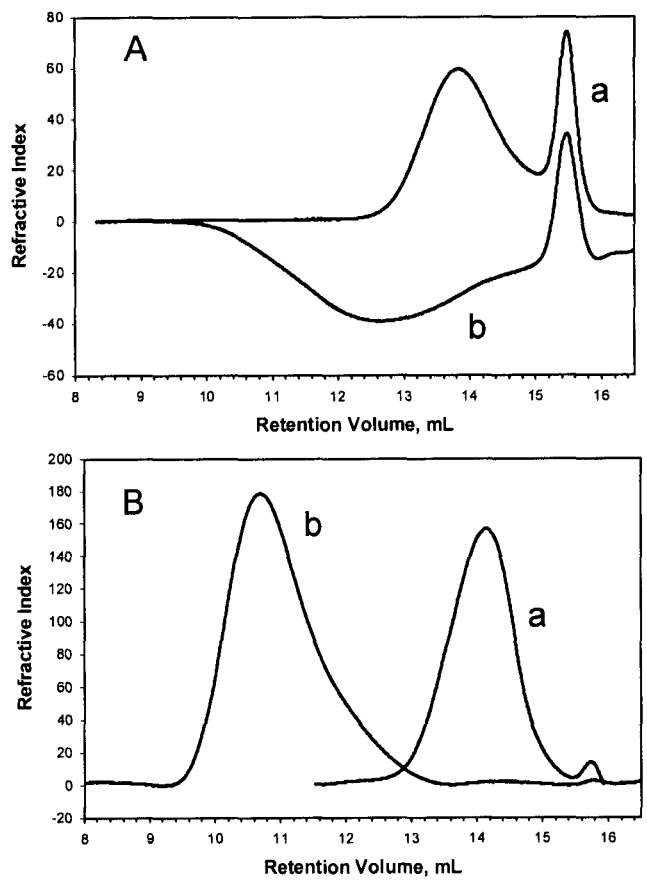
Figure 13. GPC for: A, (a) as received P[5FOx-C1] and (b) HMDI-BD(30)/P[5FOx-C1]; B. (a) P[5FOx-C1-5.2] and (b) HMDI-BD(30)/P[5FOx-C1-5.2]. Both polyurethanes were purified by precipitation into methanol/water mixture.

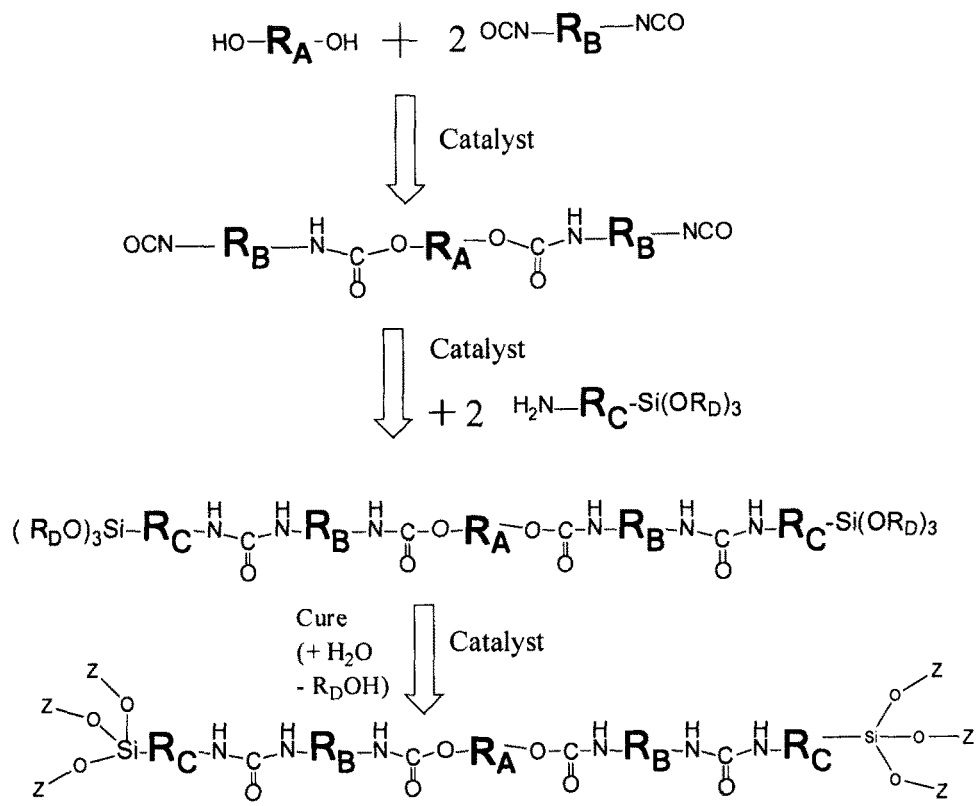
Figure 14. Generic procedure of hybrid coating formation.
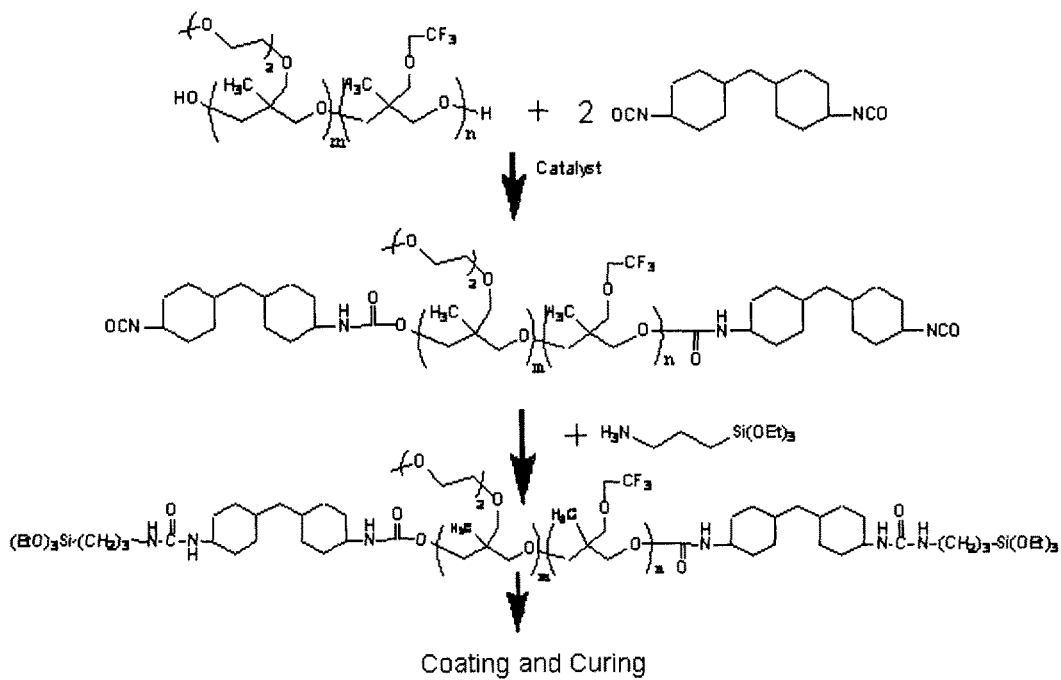
Figure 15. (3FOx-*b*-ME2Ox)-75:25-4.7-UUr-Si(8) coating synthesis procedure

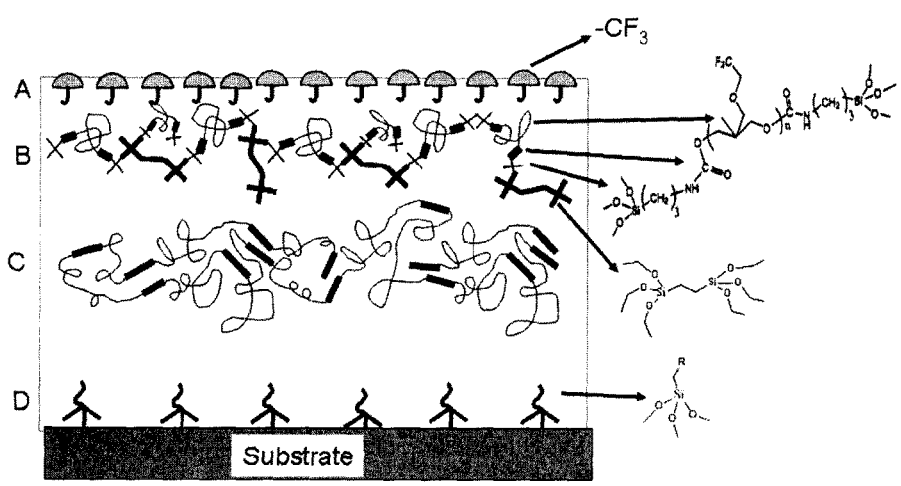

Figure 16. With reference to designations in Figure 3, schematic of components of INP-U hybrid: A, surface concentrated $-CF_3$ from 3F side chain; B, INP from the reaction between 1 and 2 followed by condensation polymerization with the 3F soft block (~), urethane (■) and $-Si(O-)_3$ network (+); C, polyurethane represented by hard (——) and soft (~)block components; D, $R-Si(O)_3$ bonding to the substrate.

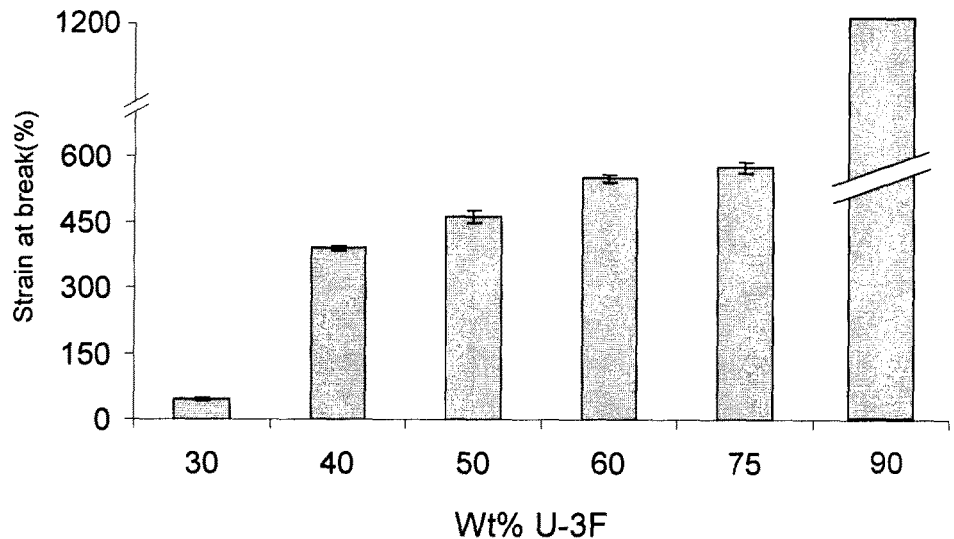
Figure 17. Strain at break as a function of wt% U-3F. The value for the neat U-3F (not shown) is similar to that for 3F-Si/H(U-3F-90).
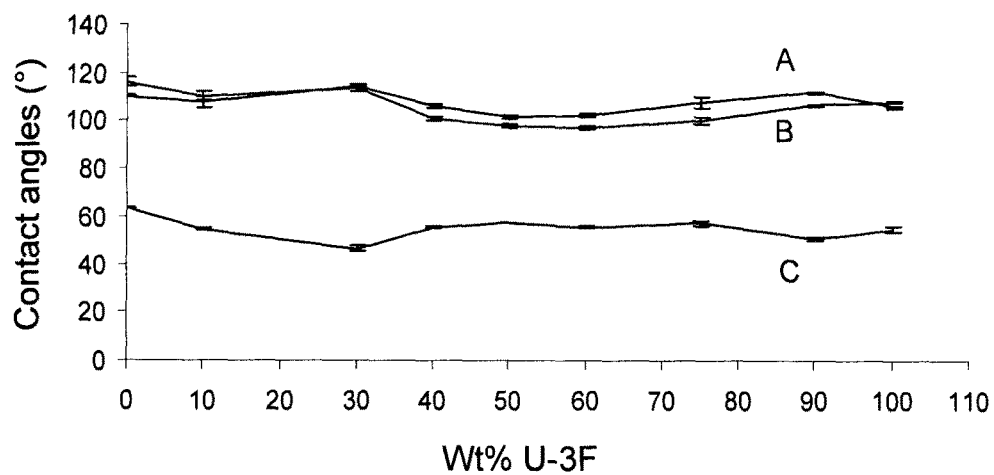
Figure 18. Contact angles as a function of wt% U-3F for hybrid coatings: DCA (Wilhelmy plate), A, B; sessile drop, C.

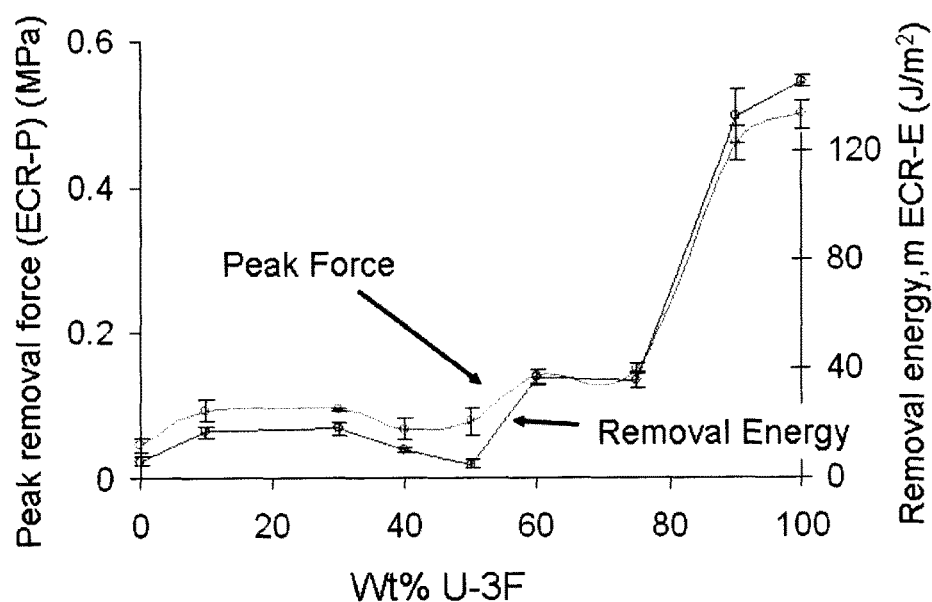
Figure 19. Peak removal force and removal energy has been plotted as a function of the wt% of U-3F in the hybrid system.

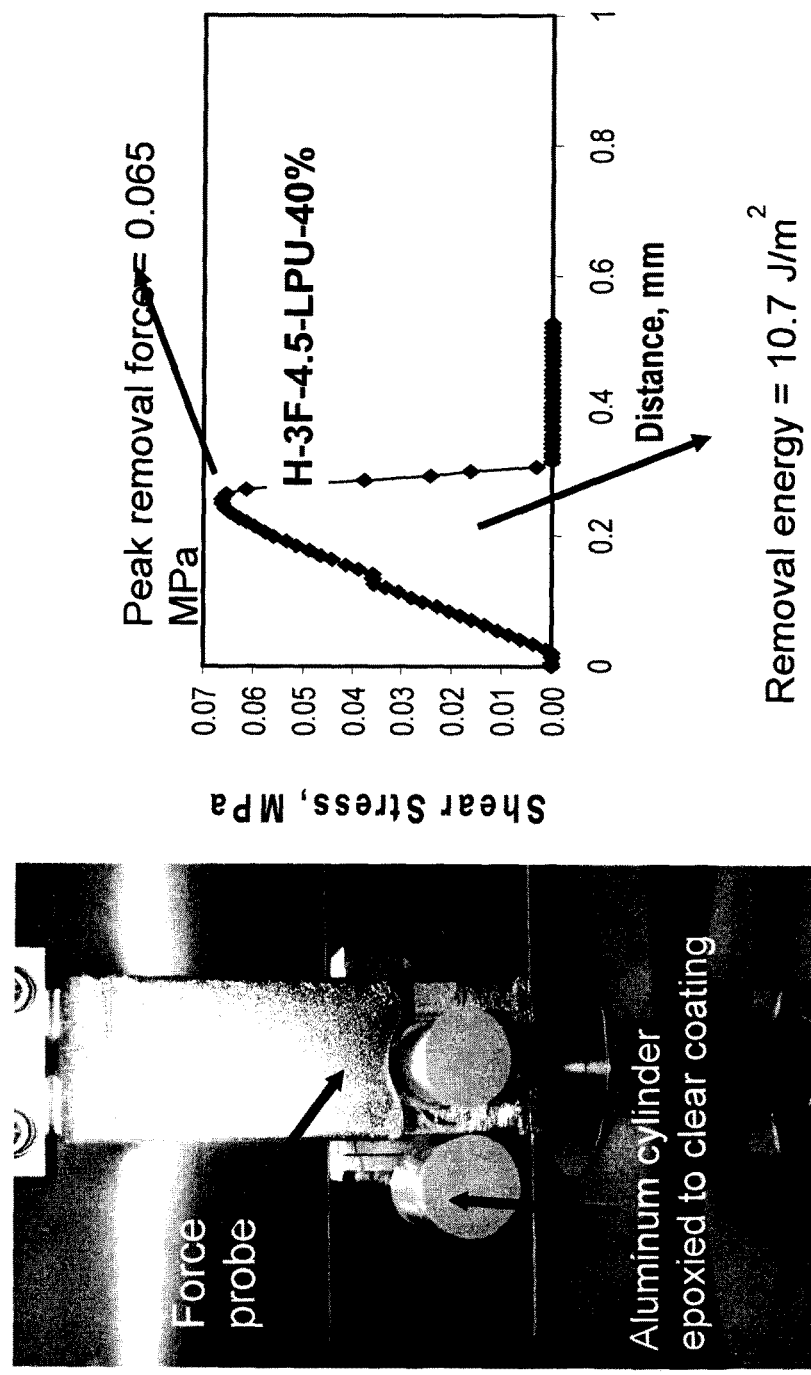
Figure 20 Abhesion tests with TA RSA-III

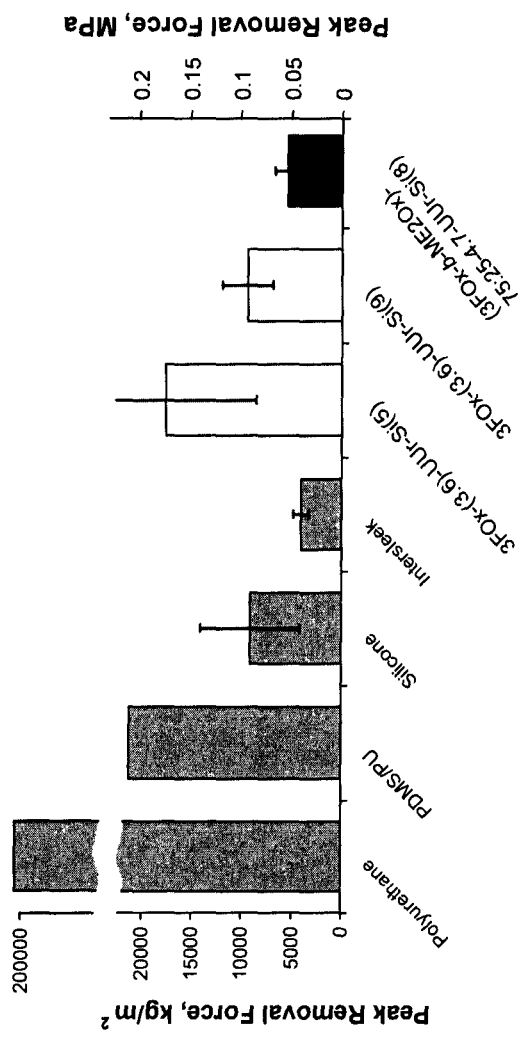
Figure 21. A comparison of peak removal force ECR-P (left, kg/m$^2$; right, MPa) for a conventional polyurethane, a silicone polyurethane, a condensation cured silicone, Intersleek™, and UUr-Si coatings.

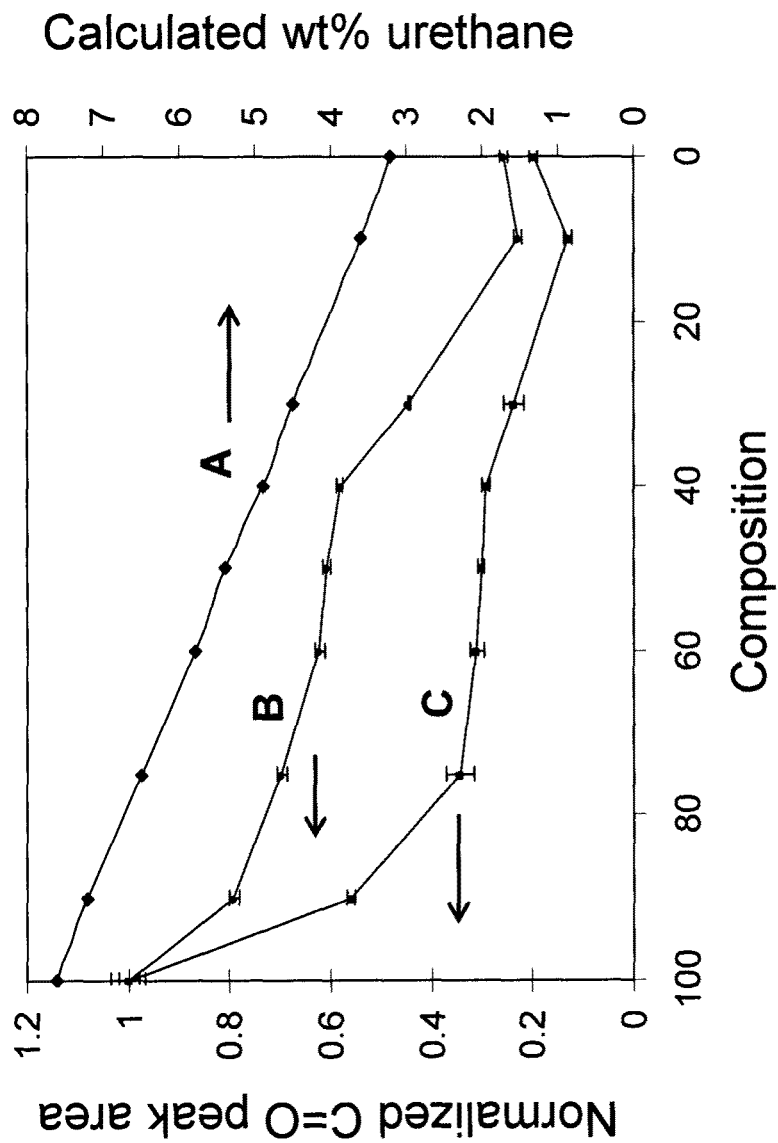
Figure 22. ATR-IR on the hybrid compositions where, A, calculated wt% urethane, B, normalized C=O peak area (diamond crystal), and C, normalized C=O peak area (germanium crystal)

ABHESIVE COATINGS

REFERENCE TO AN EARLIER APPLICATION

This application claims priority to U.S. Provisional Application No. 61/457,977, filed Jul. 26, 2011.

GOVERNMENT LICENSE RIGHTS

This invention was made with government support under DMR grants DMR-0207560 DMR-0802452, and DMR-1206259 awarded by the National Science Foundation and Office of Naval Research Grant #000140-81-09-2-2 awarded by the Office of Naval Research. The government has certain rights in the invention. National Science Foundation (DMR-grants DMR-0207560, DMR-0802452, and DMR-1206259), the Office of Naval Research (Grant #000140-81-09-2-2) and the VCU School of Engineering Foundation supported this research.

FIELD OF THE APPLICATION

The present application relates to polymer coatings and coating compositions, methods of making, and their use.

BACKGROUND

Understanding fundamental biology of settlement and growth for fouling organisms and finding ways to control or minimize fouling have been goals of much research and development. The subject is complex, ranging over areas that include fundamental biology, polymer science, coatings technology and, ultimately, paint systems.

Two major components of marine fouling are "soft" organisms such as seaweed and "hard" species including barnacles, mussels, oysters and tubeworms. Depending on factors such as temperature, salinity, location and time of year, fouling can rapidly roughen a ship hull, greatly increase drag, and cause increased fuel consumption to maintain a given speed. Hard fouling can take the form of invasive species such as zebra mussels, which are also notorious for fouling power plant heat exchangers, and are opportunistic organisms in aquaculture.

Various biocides have been incorporated in coatings so that by slow release fouling organisms are killed in the settlement stage. However, ships spend time in ports that are estuarine environments resulting in leached biocides affecting non-target species. For example, 20 ng/l tributyltin species was found to cause defective shell growth in oysters.

Such developments have led to research and development on environmentally benign methods to control fouling.

While the perfect nonfouling surface remains elusive, a practical target is a coating from which soft and hard fouling can be easily removed. Such coatings that minimize adhesion without release of toxicants or bioaccumulative species are referred to as foul release coatings (FRCs) or abhesive coatings. Applications for such abhesive coatings include not only control of marine biofouling but, because of their benign nature, include a broad scope applications such as in medical devices and in biotechnology to limit bioreactor fouling. Current compositions do not adequately address the problems.

Ice accumulation is a serious problem for aircraft, ship superstructures, wind turbine blades, power transmission lines and similar exposed structures. Icing has led to deadly accidents as well as material loss, reduced performance or interference with normal operations.

It is well known that airfoil icing disrupts airflow, reduces lift, and jeopardizes control. Ice accumulation must be removed before takeoff, typically with ethylene or propylene glycol-based fluids or foams. A gel may be used to prevent fluid runoff and retain the de-icing agent. Based on a 2009 EPA document, more than 25 million gallons of de-icing agents were applied at commercial US airports each year. De-icing agents are normally not recycled and are discharged directly into waste water systems. Such discharges have caused increased biological oxygen demand (BOD) and total organic content (TOC) in groundwater. Though not common, under certain atmospheric conditions, ice accumulation may also occur in flight. Depending on airplane design, de-icing may be accomplished by routing hot air from engines. This method obviously increases fuel cost. Icing of helicopter rotor blades has similar effects and consequences. Deicing rapidly rotating helicopter blades is not known to have a practical solution.

For "wind farms", the wind turbine blade profile is critical for optimum power production and durability. Even slight icing alters the aerodynamic blade profile and diminishes power production. Additional ice accumulation can drastically change the blade profile and increase the structural loading on the rotor and tower leading to catastrophic failure.

Power companies often suffer billion dollar losses in major winter storms. An ice storm in Canada in 1998 caused the destruction of 130 transmission towers and 30,000 utility poles and resulted in 3 million customers being without electricity (a quarter of them were still without power after three weeks). It cost power companies C$ 1 billion to make repairs caused by this damage. Telecommunication companies face similar challenges for above ground cables in winter months.

Currently used active methods for de-icing include de-icing fluids for aircraft discussed above and resistive heating where ample power is available such as wind turbines, automobile windshields, and refrigeration units. Resistive heating is costly to implement and reduces net power generated from wind farms. Passive de-icing methods such as icephobic and ice-release coatings are based on silicones or fluoropolymers. Silicones are known for their weak mechanical properties and high cost. Fluorocarbon polymers, if used in the neat form, are even more expensive than silicone materials.

It is logical to think that ice cannot form if water does not wet the surface. Therefore, superhydrophobic surfaces have been investigated to achieve icephobic surfaces. In most cases, such surfaces require careful microstructural fabrication or electrospinning to generate specific complex microstructures for samples that have dimensions of a few square centimeters. Such complex processes are not applicable for large surface areas, at least at present.

A common but mistakenly held notion is that polytetrafluoroethylene (PTFE) or "Teflon" should be good for ice release. Teflon and similar semicrystalline fluoropolymers are processable at high temperatures to generate "non-stick" surfaces for cookware and the like. However, such high temperature processes are not applicable for large area coating technologies. Secondly, polymers made of long fluorocarbon chains (>C6) are degradable to perfluorooctanoic acid (PFOA) that persists indefinitely in the environment. PFOA is bioaccumulative and is a proven carcinogen. Again, current technologies are inadequate.

BRIEF DESCRIPTION OF THE FIGURES

FIG. 1 presents structures for embodiments of 3FOx and 5FOx oxetanes.

FIG. 2 presents a preparation of embodiments of 3F—Si/H(U-3F-x) hybrid network coatings.

FIG. 3 presents one embodiment of a nanoscale, microscale and mesoscale model for abhesive coatings based on physical principles.

FIG. 4 presents a one embodiment of a 3FOx ring opening polymerization

FIG. 5 presents GPC for exemplary and comparative embodiments: A, as received P[3FOx-C1]; B, P[3FOx-C1-4.5]; C, 3FOx-C1-TL; D, P[3FOx]$_4$ from sublimation of 3FOx-C1-TL.

FIG. 6 presents $^1$H-NMR for exemplary and comparative embodiments: A, 3FOx-C1-TL; B, as received P[3FOx-C1]; C. P[3FOx-C1-4.5]; D. [3FOx]$_4$ from sublimation of 3FOx-C1-TL.

FIG. 7 presents GPC for exemplary embodiments: A, as prepared P[5FOx-S1]; B, P[5FOx-S1-5]; C, 5FOx-S1-TL.

FIG. 8 presents $^1$H-NMR for exemplary and comparative embodiments: A, 5FOx-S1-TL; B, as prepared P[5FOx-S1]; C, P[5FOx-S1-5].

FIG. 9 presents GPC for exemplary and comparative embodiments: A, as received P[5FOx-C1]; B, P[5FOx-C1-5.2]; C, 5FOx-C1-TL.

FIG. 10 presents $^1$H-NMR spectra for exemplary and comparative embodiments: A, 5FOx-C1-TL; B, as received P[5FOx-C1]; C, P[5FOx-C1-5.2].

FIG. 11 presents $^1$H-NMR for exemplary and comparative embodiments: A, 3FOx-S1-TL; B, P[3FOx-S1]; C. P[3FOx-S1-11]; D. [3FOx]4 from sublimation of 3FOx-S1-TL.

FIG. 12. presents GPC for exemplary and comparative embodiments: A, (a) as received P[3FOx-C1] and (b) HMDI-BD(30)/P[3FOx-C1]; B. (a) P[3FOx-C1-4.5] and (b) HMDI-BD(30)/P[3FOx-C1-4.5]. Both polyurethanes were purified by two reprecipitations.

FIG. 13 presents GPC for exemplary and comparative embodiments: A, (a) as received P[5FOx-C1] and (b) HMDI-BD(30)/P[5FOx-C1]; B. (a) P[5FOx-C1-5.2] and (b) HMDI-BD(30)/P[5FOx-C1-5.2]. Both polyurethanes were purified by precipitation into methanol/water mixture.

FIG. 14 presents an embodiment of a generic procedure of hybrid coating formation.

FIG. 15 presents an embodiment of (3FOx-b-ME2Ox)-75:25-4.7-UUr-Si(8) coating synthesis procedure FIG. 16 presents an embodiment of a schematic of components of INP-U hybrid: A, surface concentrated —CF$_3$ from 3F side chain; B, INP from the reaction between 1 and 2 followed by condensation polymerization with the 3F soft block (~), urethane (■) and —Si(O—)$_3$ network (+); C, polyurethane represented by hard (—) and soft (~) block components; D, R—Si(O)$_3$ bonding to the substrate.

FIG. 17 presents strain at break as a function of wt % U-3F. The value for the neat U-3F (not shown) is similar to that for 3F—Si/H(U-3F-90).

FIG. 18 presents contact angles as a function of wt % U-3F for hybrid coatings: DCA (Wilhelmy plate), A, B; sessile drop, C.

FIG. 19 presents peak removal force and removal energy plotted as a function of the wt % of U-3F in an embodiment of a hybrid system.

FIG. 20 presents abhesion tests with TA RSA-III.

FIG. 21 presents a comparison of peak removal force ECR-P (left, kg/m$^2$; right, MPa) for exemplary and comparative embodiments.

FIG. 22 presents ATR-IR on the hybrid compositions where, A=calculated wt % urethane, B=normalized C═O peak area (diamond crystal), and C=normalized C═O peak area (germanium crystal).

BRIEF SUMMARY OF THE SEVERAL EMBODIMENTS

The approach to abhesive coatings described herein focuses on multiscale physical requirements illustrated in FIG. 3 that include the need for: A, low work of adhesion; B, "soft surface" or more correctly, near surface, that facilitates "peel" and low pull off force (Eq 1); C, tough bulk mechanicals; and D, adhesion to substrate.

These multiscale requirements are met via a hybrid polymeric coating, that is one comprised of inorganic and organic components. By a judicious choice of precursors to the hybrid siliceous inorganic network polymer (INP) and for the linear polymer component, a polyurethane simply designated "U", the multifunctionality required for the physical model shown in FIG. 3 has been achieved with a first generation INP-U abhesive coating. This approach has been validated by an innovative laboratory test for abhesion.

One embodiment provides a mixture, comprising:
a fluorous oxetane having the formula:

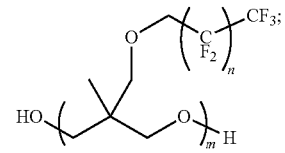

wherein n is an integer of 0-11, and m is an integer>0;
a polydispersity index, PDI$_O$ M$_w$/M$_n$, of 1.0-2.0; and
a percent purity of 90%-100%.

The polydispersity index PDI$_O$ M$_w$/M$_n$, of 1.0-2.0 includes all values and subranges therebetween, including 1.0, >1.0, 1.1, 1.2, 1.3, 1.4, 1.5, 1.6, 1.7, 1.8, 1.9, and 2.0, or any value or subrange therein. In one embodiment, the polydispersity index PDI$_O$ ranges from >1.0 to 2.0. In another embodiment, the polydispersity index PDI$_O$ ranges from ≥1.0 to 1.8.

The percent purity may suitably range from 90% to 100%, which includes all values and subranges therebetween, including 90, >90, 91, 92, 93, 94, 95, 96, 97, 98, 99, and 100%, or any value or subrange therein. In one embodiment, the percent purity ranges from 95%-100%. In another embodiment, the percent purity ranges from 95% to 99%.

In the fluorous oxetane, n may be an integer of 0-11, which includes all values and subranges therebetween, including 0, 1, 2, 3, 4, 5, 6, 7, 8, 9, 10, and 11. In one embodiment, n is 0, 1, or 2.

In the fluourous oxetane, m is an integer>0.

One embodiment provides a composition, comprising a polymerization product of:
the above mixture, a copolyoxetane having the formula:

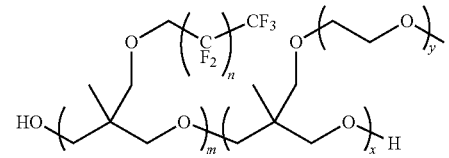

wherein n is an integer of 0-11, and m is an integer>0; and
wherein y is an integer of 0-11, and x is an integer>0;
or a combination of the mixture and copolyoxetane; and (B) one or more of an isocyanate, diisocyanate, or combination thereof; and (C) optionally, a diol or diamine chain extender.

In the copolyoxetane, n and m may suitably adopt the same values noted above for the fluourous polyoxetane. The y is an integer of 0-11, which includes all values and subranges therebetween, including 0, 1, 2, 3, 4, 5, 6, 7, 8, 9, 10, and 11. In one embodiment, y is 0, 1, or 2. In the copolyoxetane, x is an integer>0.

In the copolyoxetane, the ratio of fluorous to non-fluourous oxetane (m:x) is not particularly limited. In a non-limiting example, the m:x ratio can suitably range from 1:1000 to 1000:1, which includes all values and subranges therebetween, including 1:1000, 900, 800, 700, 600, 500, 400, 300, 200, 100, 90, 80, 70, 60, 50, 40, 30, 20, 10, 9, 8, 7, 6, 5, 4, 3, 2, and 1 or any subrange therein or combination thereof; and 1, 2, 3, 4, 5, 6, 7, 8, 9, 10, 20, 30, 40, 50, 60, 70, 80, 90, 100, 200, 300, 400, 500, 600, 700, 800, 900, and 1000 or any subrange therein or combination thereof. In one embodiment, m is 75 and x is 25.

The diisocyanate is not particularly limiting. Non-limiting examples of the diisocyanate include methylene dicyclohexyl diisocyanate, diphenylmethane diisocyanate, hexamethylene diisocyanate, isophorone diisocyanate, toluene diisocyanate, xylylene diisocyanate, cyclohexane diisocyanate, tetramethyl xylylene diisocyanate, trimethylhexamethylene diisocyanate, norbornane diisocyanate, phenylene diisocyanate, or a combination of two or more thereof.

The isocyanate is not particularly limiting. Non-limiting examples of the isocyanate include compounds having the formula:

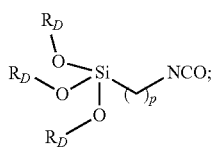

wherein $R_D$ is —$CH_3$, —$CH_2CH_3$, —$CH_2CH_2CH_3$, —$CH_2CH_2CH_2CH_3$, and p is an integer of 1-10. The p range includes all values and subranges therebetween, including 1, 2, 3, 4, 5, 6, 7, 8, 9, 10, and 11, or any subrange therein. In one embodiment, p is 1, 2, 3, or 4.

If desired, one or more chain extenders may be used, which are not particularly limiting. Any suitable diol or diamine chain extender may be used. Non-limiting examples of the diol include a $C_{1-10}$ alkylene diol, $C_{1-10}$ alkenylene diol, $C_{1-20}$ aralkylene diol, 1,4-butanediol, or the like, though others are possible. Similarly, non-limiting examples of diamine chain extenders include $C_{1-10}$ alkylene diamine, $C_{1-10}$ alkenylene diamine, $C_{1-20}$ aralkylene diamine, or the like.

One embodiment provides a composition, comprising a polymerization product of: the above composition and one or more amines having the formula:

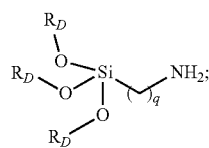

wherein $R_D$ is —$CH_3$, —$CH_2CH_3$, —$CH_2CH_2CH_3$, —$CH_2CH_2CH_2CH_3$;

and q is an integer of 1-10.

One embodiment provides a composition for coating, comprising a compound having the formula:

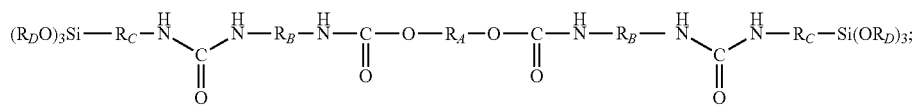

and optionally a solvent;

wherein —O—$R_A$—O— is derived from a fluorous oxetane having the formula:

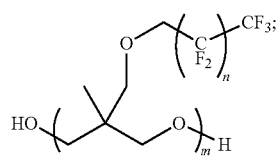

wherein n is an integer of 0-11, and m is an integer>0;

or a copolyoxetane having the formula:

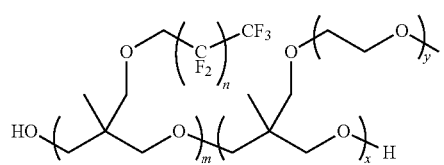

wherein n is an integer of 0-11, and m is an integer>0; and wherein y is an integer of 0-11, and x is an integer>0;

wherein —(C=O)NH—$R_B$—NH(C=O)— is derived from methylene dicyclohexyl diisocyanate, diphenylmethane diisocyanate, hexamethylene diisocyanate, isophorone diisocyanate, toluene diisocyanate, xylylene diisocyanate, cyclohexane diisocyanate, tetramethyl xylylene diisocyanate, trimethylhexamethylene diisocyanate, norbornane diisocyanate, phenylene diisocyanate, or a combination of two or more thereof;

wherein $R_C$ is a $C_{1-10}$ alkylene; and wherein $R_D$ is —$CH_3$, —$CH_2CH_3$, —$CH_2CH_2CH_3$, —$CH_2CH_2CH_2CH_3$.

In the composition, the n, m, y, and x values may suitably adopt the values and ranges mentioned above. Similarly, for $R_C$, the $C_{1-10}$ alkylene range suitably includes all values and subranges therebetween, including 1, 2, 3, 4, 5, 6, 7, 8, 9, or 10 carbons, or any subrange therein.

One embodiment provides a coating, comprising a compound having the formula:

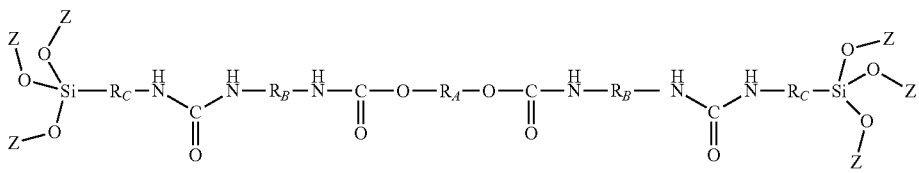

in contact with a surface;
wherein —O—$R_A$—O— is derived from a fluorous oxetane having the formula:

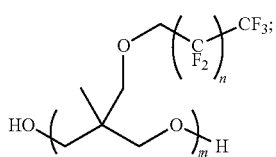

wherein n is an integer of 0-11, and m is an integer>0; or a copolyoxetane having the formula:

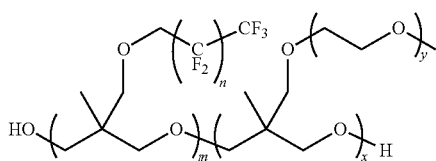

wherein n is an integer of 0-11, and m is an integer>0; and
wherein y is an integer of 0-11, and x is an integer>0; wherein —(C=O)NH—$R_B$—NH(C=O)— is derived from methylene dicyclohexyl diisocyanate, diphenylmethane diisocyanate, hexamethylene diisocyanate, isophorone diisocyanate, toluene diisocyanate, xylylene diisocyanate, cyclohexane diisocyanate, tetramethyl xylylene diisocyanate, trimethylhexamethylene diisocyanate, norbornane diisocyanate, phenylene diisocyanate, or a combination of two or more thereof;
wherein $R_C$ is a $C_{1-10}$ alkylene; and
wherein each Z is independently Si or H.

In the composition, the n, m, y, and x values may suitably adopt the values and ranges mentioned above. Similarly, for $R_C$, the $C_{1-10}$ alkylene range suitably includes all values and subranges therebetween, including 1, 2, 3, 4, 5, 6, 7, 8, 9, or 10 carbons, or any subrange therein.

As used herein, the meaning of the term, "derived from" will be readily apparent to one of ordinary skill in the polymer art. For example, in the composition, —O—$R_A$—O— is derived from the fluorous oxetane or copolyoxetane in the sense that a moiety appearing in a polymer is derived from the corresponding monomer or oligomer.

One embodiment provides a method for producing the fluorous oxetane mixture, comprising contacting a first mixture comprising the fluorous oxetane with at least one solvent, carrying out a liquid-liquid extraction, and separating. Here, so long as the solvent or solvents will suitably remove low molecular weight (LMW) compounds and cyclics from and/or reduce the overall polydispersity index $PDI_O$ and increase the percent purity of the fluorous oxetane, the solvent is not particularly limited. Non-limiting examples of solvents include alkanes, alcohols, hexane, methanol, or combinations thereof. Given the teachings herein, one can readily determine the conditions for liquid-liquid extraction. As discussed herein, if n=0 in the fluorous oxetane, the solvent for extraction may be a single solvent or a mixture of two miscible solvents. If n is greater than zero, then the solvent is a mixture of two immiscible solvents.

One embodiment provides a method for purifying the fluorous polyoxetane, comprising extracting one or more low molecular weight compounds and one or more cyclic compounds therefrom by liquid-liquid extraction.

One embodiment provides a method for making the above composition, comprising contacting (A), (B), and optionally (C), and polymerizing.

One embodiment provides a method for making the above composition, contacting:
(a1) the fluorous oxetane mixture described herein;
(a2) the copolyoxetane described herein; or
(a3) a combination of (a1) and (a2);
and
(b1) one or more of an isocyanate, diisocyanate, or combination thereof; and
(c1) optionally, a diol or diamine chain extender;
and polymerizing, to produce a first polymerization product;
contacting the first polymerization product with one or more amines having the formula:

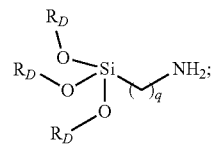

wherein $R_D$ is —$CH_3$, —$CH_2CH_3$, —$CH_2CH_2CH_3$, —$CH_2CH_2CH_2CH_3$; and
wherein q is an integer of 1-10;
and reacting, to produce the composition.

Here, the 1-10 range for q includes all values and subranges therebetween, including 1, 2, 3, 4, 5, 6, 7, 8, 9, and 10, or any subrange therein.

One embodiment provides a composition, comprising a polymerization product of the above composition and one or more bis(trialkoxysilyl)alkanes having the formula:

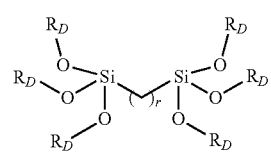

wherein $R_D$ is —$CH_3$, —$CH_2CH_3$, —$CH_2CH_2CH_3$, —$CH_2CH_2CH_2CH_3$, and r is an integer of 1-10. Here, the 1-10 range for r includes all values and subranges therebetween, including 1, 2, 3, 4, 5, 6, 7, 8, 9, and 10, or any subrange therein.

One embodiment provides a composition, comprising a polymerization product of:
the above composition; and
a composition comprising a polymerization product of:
(A1) the fluorous oxetane mixture;
(A2) the copolyoxetane; or
(A3) a combination of the mixture (A1) and copolyoxetane (A2);
and
(B) one or more of an isocyanate, diisocyanate, or combination thereof; and
(C) optionally, a diol or diamine chain extender.

One embodiment provides a method for making the composition, comprising contacting:
(a1) the fluourous oxetane mixture;
(a2) the copolyoxetane; or
(a3) a combination of (a1) and (a2);
and
(b1) one or more of an isocyanate, diisocyanate, or combination thereof; and
(c1) optionally, a diol or diamine chain extender;
and polymerizing, to produce a first polymerization product;
contacting the first polymerization product with one or more of the above bis(trialkoxysilyl)alkanes;
and reacting,
to produce the composition.

One embodiment provides a method for making a composition, comprising contacting:
(a1) the fluorous oxetane mixture;
(a2) the copolyoxetane; or
(a3) a combination of (a1) and (a2); and
(b1) one or more of an isocyanate, diisocyanate, or combination thereof; and
(c1) optionally, a diol or diamine chain extender;
and polymerizing, to produce a first polymerization product;
contacting the first polymerization product with one or more of the above bis(trialkoxysilyl)alkanes;
and reacting,
to produce a second polymerization product;
contacting the second polymerization product with:
(a1) the fluorous oxetane mixture;
(a2) the copolyoxetane; or
(a3) a combination of (a1) and (a2);
and
(b1) one or more of an isocyanate, diisocyanate, or combination thereof; and
(c1) optionally, a diol or diamine chain extender;
and polymerizing, to produce the composition.

One embodiment provides a monolithic, self-stratifying polymer coating, comprising:
inner and outermost surfaces on opposite sides of the coating, the inner surface being in contact with and adhered to an article;
a surface region, extending from the outermost surface to a depth of about 2 nm from the outermost surface;
a middle region, extending from a depth of about 2 nm from the outermost surface to a depth of less than about 2000 nm from the outermost surface; and
a bulk region, extending from a depth of less than about 2000 nm from the outermost surface to the inner surface;
wherein the surface region comprises a fluorous polyoxetane having the formula:

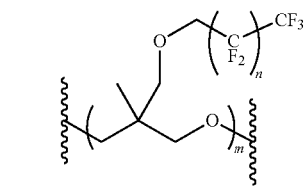

wherein n is an integer of 0-11, and m is an integer>0, in a greater concentration relative to the middle and bulk regions;
wherein the middle region comprises —$SiO_{1.5}$ in a greater concentration relative to the surface and bulk regions;
and wherein the bulk region comprises a polyurethane in a greater concentration relative to the surface and middle regions.

A coated surface, comprising the cured polymerization product of claim 11 in contact with a surface.

One embodiment provides an article selected from the group consisting of an airfoil, wing, propeller, hull, superstructure, railing, intake, hatch, keel, rudder, deck, antenna, medical device, kitchen device, counter, pipe, wind turbine, aircraft, ship, rotor blade, transmission tower, transmission line, cable, cooling coil, refrigerator, freezer, or combination thereof, comprising any of the coatings or compositions on a surface thereon.

One embodiment provides a method, comprising applying any of the compositions described herein to a surface, and allowing the composition to cure, to produce a coated surface.

One embodiment provides a coated surface, comprising the cured polymerization product of any of compositions described herein in contact with a surface.

One embodiment provides a composition for coating, comprising any of the compositions described herein and a solvent.

EXAMPLES

Materials. Poly(3-(2,2,2-trifluoroethoxymethyl)-3-methyloxetane) P[3FOx] 2 (sometimes also designated herein as 3F diol) and poly(3-(3,3,3-trifluoro-2,2-difluoro-propoxymethyl)-3-methyloxetane) P[5FOx]-4 were either made in house P[3FOx-S] or P[5FOx-S] as described below or were generously provided by OMNOVA Solutions, Akron Ohio (PF 6320 and PF6520) (P[3FOx-C] or P[5FOx-C]). 3-Isocyanatopropyltriethoxysilane (SII 6456) was purchased from Gelest, Inc. Bis(triethoxysilyl)ethane, SIB1817 was obtained from Gelest. 4,4'-Methylenebis(cyclohexyl isocyanate) (HMDI), dibutyltin dilaurate (T-12), dibutyltin diacetate (tech), methylene chloride ($CH_2Cl_2$), 3-aminopropyl triethoxysilane, and tetrahydrofuran (THF) were acquired from Sigma Aldrich. 1,4-Butanediol (BD) 99+%, hexane, and tetrahydrofuran, 99.6%, (for analysis ACS, stabilized with BHT) were from Acros Organics. All organic solvents were used as received or kept over 4A molecular sieves. The structures of fluorous oxetanes are shown in FIG. 1.

Instrumentation and Testing.
Infrared spectroscopy. FT-IR spectra were obtained using a Nicolet 400 FT-IR spectrometer. Attenuated total reflection ATR-IR spectra of the copolyoxetane coated surfaces were obtained by using a Nicolet iS10 with Smart iTR attachment. A background spectrum was taken before each scan. Coated microscope slides were placed on Ge crystal and 32 scans were taken from 500 to 4000 $cm^{-1}$. The spectra were analyzed using Omnic software. The penetration of the evanescent infrared wave with the Ge crystal is 0.7 µm.

Differential Scanning Calorimetry. M-DSC was done with a TA-Q 1000 Series™ instrument (TA Instruments) with modulation amplitude off±0.5° C., modulation period of 20 seconds. The sample (5-15 mg) was equilibrated at −90° C. followed by a heating ramp of 6° C./min till 150° C. This was followed by a cooling ramp of 10° C./min back to −90° C. and again the same heating cycle was repeated. Two consecutive heating cycles were also followed to observe any changes with heat treatment. A pre-run sample was also heated at 100° C. to mimic the curing conditions for 24 hr and then kept at ambient for another 24 hr. The same heating-cooling-heating cycles were followed to study thermal transitions. Standard samples of zinc, tin and lead were used for energy and temperature calibration.

Thermogravimetric Analysis. TGA was done with a TA-Q 5000 Series™ instrument (TA Instruments) within a temperature range of 20 to 1000° C. Samples were taken in platinum pans and heated in an atmosphere of nitrogen at a flowrate of 20 ml/min. The weight loss and the derivative weight loss were monitored as a function of temperature.

Wetting Behavior. The surface wetting characteristics of coated slides were measured by the dynamic contact angle (Wilhelmy plate). DCA was carried out using a Cahn model 312 contact angle analyzer. Deionised water was used as the probe liquid for all samples with an immersion/withdrawal rate of 100 µm/s. Hexadecane was used for some of the samples to determine oleophobicity of the coated surfaces. Reported contact angles are averages of several force-distance cycles. Accuracy is generally ±1-2°.

Static contact angles and image profiles were obtained by using a Ramé-Hart goniometer equipped with a camera. The contact angles were calculated using Drop Image software (version 1.4.11). The reported value is an average of contact angles obtained from 3 drops taking 5 readings per drop.

Swelling. Oil was estimated by immersing a microscope slide with a representative 3F-Si/H(U-3F-40) coating in hexadecane for 24 hours. For comparison, a condensation cured PDMS coating was made from polydimethylsiloxane diol (4.2 kDa) cured with bis(triethoxysilyl)ethane (10 wt %). To determine mass uptake, each slide was weighed before and after immersion.

Tapping Mode Atomic Force Microscopy (AFM). A Dimension Nanoscope V (Veeco, Calif.) atomic force microscope was used for morphological analysis of the coated surfaces. Surface interrogation was done in tapping mode using silicon crystal cantilevers (40 N/m). Imaging was done at both soft and hard tapping by altering the setpoint ratio $r_{sp}$ or $A_{exp}/A_o$ from 0.95 to 0.8, where $A_o$ is free oscillation amplitude and $A_{exp}$ is the experimental oscillation amplitude. Images with scan sizes of 50 µm, 10 µm and 2 µm were taken to probe into microscale and nanoscale morphology of the coated surfaces.

Abhesion test. The abhesion test parallels ASTM D5618-94 (2011) "Standard Test Method for Measurement of Barnacle Adhesion Strength in Shear." The ease of release was tested by bonding an aluminum cylinder to a fully cured, coated glass slide with an epoxy resin adhesive (Loctite Epoxy, marine, white, Henke Corporation, Rocky Hill, Conn., USA). This adhesive, recommended by the manufacturer for marine applications, has a suggested cure time of 2 hours. The diameter and height of the aluminum cylinder were 10×20 mm, respectively. After spreading a thin film of epoxy on the end of the cylinder, it was placed upright on a coated slide and lightly pressed into place. Over the course of a few minutes, usually three such cylinders were fastened to a single coated glass slide. The epoxy was allowed to cure for a minimum of 24 hr at ambient temperature.

A holder for a glass microscope slide was fabricated and installed in a Dynamic Mechanical Analyser-RSA-III (TA instruments). The coated slides with bonded aluminum cylinders were clamped into the fixture and peak removal stress and removal energy for detachment of the aluminum cylinder was determined. This test gives the peak removal force for "epoxied aluminum cylinder removal" (ECR-P) but also ECR energy (ECR-E or removal energy).

The acronym ECR is chosen for the abhesion test so as not to include "A" for aluminum, as the test could just as well be carried out with other materials such as steel or fiberglass. Initially, the test was carried out with wooden dowels, but the dowel was dented by the force probe in the course of testing. Thus, the cylinder should be rigid so as not to deform during the abhesion test.

The probe speed was constant at 0.3 mm/min. The RSA-III has a load cell with a maximum load of 3.5 kg. Thus, this abhesion test is only applicable to removal of test specimens that are weakly bonded.

Mechanical testing. Dynamical mechanical and tensile mechanical properties of the coatings/films prepared in last section were measured using a TA instruments RSA III dynamic mechanical analyzer. During analysis sample temperature was ramped from −90 to 150° C. at 5° C./min while tension cycles were set at 1 Hz with maximum strain set to 0.05%. Maximum autotension was set to 2 mm with maximum autotension rate of 0.01 mm/s. For tensile testing, rectangular samples were stamped out of cast plaques and measure for thickness, width and gauge (mm). After obtaining the sample dimensions, the sample was clamped into the RSA holder. The data acquisition rate was set to 1 Hz while the initial sample elongation rate was set to 10 mm/min. The modulus of elasticity was determined from the initial portion of the stress strain curve. Strain to break was noted, provided that sample extension did not exceed the limits of the instrument (1200%).

X-Ray photoelectron spectrometry (XPS). X-ray Photoelectron Spectroscopy (XPS) measurements were carried out on the Thermo Fisher Scientific ESCALAB 250 "X-ray Photoelectron spectrometer". This instrument has monochromatized Al K α X-ray and low energy electron flood gun for charge neutralization. X-ray spot size for these acquisitions was on the order of 500 mm. Pressure in the analytical chamber during spectral acquisition was less than $2 \times 10^{-8}$ Torr. Pass energy for survey spectra was 150 eV. The take-off angle was 90, 57 and 24°. The data were analyzed with the Thermo Avantage software (v4.40). Samples for XPS characterization were cut and attached on the surface of a silicon wafer.

Example 1 a. Preparation of poly(2-2,2,2-trifluoroethoxy-2-methyl) oxetane. Synthesis of poly(2-2,2,2-trifluoroethoxy-2-methyl)oxetane with the general formula HO—([CH$_2$C(CH$_3$)(CH$_2$OCH$_2$CF$_3$)CH$_2$O]$_n$)H, abbreviated P[3FOx] 2, was carried out according to known methods (U.S. Pat. Nos. 5,703,194, 5,807,977, and 5,668,251; Wesdemiotis, C., et al., *Macromolecules* 2006 (39), 8369-8378) by ring-opening polymerization (ROP) with boron trifluoride diethyl etherate (0.34 gram, 2.41 mmol) as catalyst and 0.1 gram (1.09 mmol) 1,4 butanediol as initiator, 20 g (109 mmol) 3-methyl-3-[(2,2,2-trifluoroethyoxy)methyl]-1,3 oxetane (3FOx, 1) was polymerized. The reaction was carried out in CH$_2$Cl$_2$ at −5 to 5° C. under a slow dry nitrogen purge. 3FOx monomer was slowly added by means of a metering pump over 6 hr. After addition of monomer, the reaction mixture was stirred for 12 hr then quenched with water (50 ml). The organic and water layers were separated and the organic layer was washed with 50 ml of 3% aqueous NaCl and HCl solutions. The organic layer was collected and solvent was removed by rotary evaporation. Drying was effected at 60° C. under vacuum for 24 hours to give 19.2 g crude P[3FOx-S1] (96% yield). The P[3FOx-S1] designation for this initial multi-component material designates the crude product was in-laboratory synthesized, sample or preparation 1. Table 1 lists all designations.

Initial $^1$H-NMR end group analysis using trifluoroacetic anhydride gave Mn=10 kDa (Table 1). GPC with a refractive index (RI) detector showed two peaks. From high MW to low MW, the first broad peak (Peak 1) is the main peak (89% relative area) with Mn=10.1 kDa. The polydispersity (PDI (Peak 1=PDI$_1$, Mw/Mn) is 1.61. The second peak (Peak 2) is the minor peak (11% relative area) with Mn=1.3 kDa with a PDI$_2$ 1.01. The overall polydispersity for P[3FOx-S1] (PDI$_O$, Mw/Mn) is 2.58. PDI's have relative accuracy but not absolute accuracy because of the lack of good molecular weight standard for GPC calibration. Peak 2 is believed to correspond mostly to cyclic tetramer, [3Fox]$_4$ as suggested earlier. The narrow peak (PDI$_2$ 1.01) supports this idea. Again, there is only approximate agreement with the calculated MW of tetramer (736 g/mol) due to lack of a good molecular weight standard.

b. Liquid-liquid extraction. P[3FOx-S1] (19 g) was mixed with 300 ml n-hexane in a separatory funnel followed by thorough shaking. After settlement, two layers resulted: bottom layer (~50 ml) and top layer (~270 ml). The top layer is considered extracted layer 1. The layers were separated and 300 ml n-hexane was added to the 50 ml bottom layer using a clean separatory funnel. After shaking, the layers were separated and, in a separate container, top layer 2 was added to top layer 1 (1 designates the first extracted layer and 2 designates the second extracted layer). Solvent was removed from the bottom layer and the combined top layers 1 and 2 by distillation. The respective bottom layer and combined top layers (3FOx-S1-TL, Table 1) were further dried at 60° C. under vacuum for 24 hours. Yield of purified P[3FOx-S1-11] from the bottom layer was 74%. This purified product is designated P[3FOx-S1-11], where S=synthesized, 1=sample number, and 11=11 kDa for the Mn determined by H$^1$-NMR end group analysis (Table 1). This molecular weight is used for stoichiometry calculations.

c. GPC on products. GPC was carried out on P[3FOx-S1-11] that remained in the bottom layer after two extractions and hexane stripping. The resulting chromatogram showed that Peak 2 (lower molecular weight) was reduced to ~1% of the total area. The overall P[3FOx-S1-11] PDI$_O$ was reduced from the original 2.58 to 1.80.

For the top layer residue (3FOx-S1-TL, Table 1), Peak 2 became the main peak, contributing 53% of the total area under the curve. Mn and PDI for this peak are the same as that of the corresponding peak in the P[3FOx-S1] crude product. Peak 1 of the top layer, however, has a reduced intensity with Mn at 4.5 kDa and PDI$_1$ at 2.08.

To confirm the presence of cyclics, a sample of 3FOx-S1-TL was placed in a vacuum sublimator at 165° C./1.0 Torr. The sublimate showed only one single sharp GPC peak with Mn=1.3 kDa and a PDI$_2$ of 1.01, which has the same retention volume as Peak 2 observed in the other samples. The mass spectrum shows that this sublimate is mainly cyclic tetramer [3FOx]$_4$ (MW=736 g/mol or 0.736 kDa) with linear tetramers and pentamers (both linear and cyclic) as minor components. This result agrees with the result in the above-mentioned paper by Wesderniotis et al. on the mass spectrum of P[3FOx] polyol with cyclic tetramers.

d. $^1$H NMR spectra. An $^1$H-NMR spectrum of P[3FOx-S1], P[3FOx-S1-11], and 3FOx-S1-TL is comprised of peaks for 3-methyl groups at ~0.9 ppm and methylene protons at 3-4 ppm. P[3FOx-S1] has about 11% (GPC) cyclics and other components so that the spectrum of the purified product P[3FOx-S1-11] has only subtle differences compared to P[3FOx-S1]. The spectrum of 3FOx-S1-TL is clearly different, having multiple overlapping peaks due to concentrated cyclics as well as other components. Thus a well-defined quartet for the main chain —CH$_2$— protons is observed for the purified P[3FOx-S1-11] and even P[3FOx-S1], while the quartet for 3FOx-S1-TL is not well resolved due to overlapping signals. Similarly, the side chain —CH$_2$— c-protons have a single peak at 3.43 ppm for P[3FOx-S1-11] but a broadened multiplet for 3FOx-S1-TL. Interestingly, the product of sublimation from the top layer product, which was shown by mass spectroscopy to be predominantly P[3FOx]$_4$, clearly shows three methyl group a-peaks that must arise from the presence of isomers.

Example 2

Purification of as received poly(2-2,2,2-trifluoroethoxy-2-methyl)oxetane. Poly(3-methyl-3-[2,2,2-trifluoroethyoxy) methyl]-1,3-oxetane), was obtained from OMNOVA Solutions, Inc. The product number: is POLYFOX PF-6320 (2210AM) (name designation as of 14 May 2009). This polyoxetane is designated as P[3FOx-C1], with C for Commercial.

a. GPC. The GPC result with a refractive index (RI) detector showed two peaks. From high MW to low MW, the first broad peak (Peak 1) constitutes slightly more than half (52%) of the relative area with Mn=5.1 kDa. The polydispersity of this peak (PDI$_1$, Mw/Mn) is 1.08. The second peak (Peak 2) is a sharp peak (48% relative area) with Mn=1.3 kDa with a PDI$_2$ 1.01. The overall Mn for P[3FOx-C1] is 2.4 kDa and the PDI$_O$ is 1.39. This is an approximate number because of the lack of good molecular weight standard for GPC calibration. Peak 2 is believed to correspond primarily to P[3FOx]$_4$ as suggested earlier[24-26] and shown in Example 1. The narrow peak (PDI$_2$ 1.01) supports this observation.

As will discussed below, Mn for P[3FOx-C1] by $^1$H-NMR end group analysis is 3.7 kDa, which is larger than Mn determined by GPC (2.4 kDa). This is due to the presence of cyclics that do not contribute to the intensity of the end group protons and to monofunctional polyoxetanes that contribute half the number of end groups. The result is an apparently larger repeating unit to end group ratio in molecular weight calculations.

There is only approximate agreement for the GPC determined Mn with the calculated MW of tetramer (0.736 kDa), again due to lack of a good molecular weight standard.

b. Liquid-liquid extraction of crude P(3FOx-C1). 150 grams of P(3FOx-C1) was mixed with 400 ml n-hexane in a separatory funnel followed by thorough shaking. After settlement, two layers resulted: bottom layer (~250 ml) and top layer (~250 ml). The top layer is considered extracted layer 1. The layers were separated and 250 ml n-hexane was added to the 250 ml bottom layer using a clean separatory funnel. After shaking, the layers were separated and, in a separate container, top layer 2 was added to top layer 1 (1 designates the first extracted layer and 2 designates the second extracted layer). Anticipating the need for multiple extractions due to the high concentration of cyclics and LMW components, the above procedure was repeated eight more times. Solvent was removed from the bottom layer and the combined top layers from extractions 1-10 by distillation. The respective bottom and combined top layers were further dried at 60° C. under vacuum for 24 hours. The bottom layer yield was 50 g (33%).

c. GPC after extraction. GPC was carried out on P[3FOx-C1] that remained in the bottom layer after ten extractions and stripping hexane. The purified product is designated P[3FOx-C1-4.5] using Mn from end group analysis discussed below (Table 1) or simply "3F". The resulting chromatogram showed that Peak 2 (LMW) of the bottom layer was reduced to ~2% of the total area. The overall P[3FOx-C1-4.5] $PDI_O$, which includes the small contribution from residual cyclics and LMW constituents was reduced to 1.15. Overall Mn was 4.3 kDa by GPC and 4.2 kDa by NMR end group analysis. The close agreement in Mn by the two methods indicates that the concentration of cyclics and LMW polyoxetanes was reduced to a negligible level.

For the top layer residue 3FOx-C1-TL, Peak 2 became more prominent, contributing 66% of the total area under the curve. Mn and $PDI_2$ are same as that of the corresponding peak in the as received sample. Peak 1 for 3FOx-C1-TL has a reduced Mn at 3.8 kDa with $PDI_1$ at 1.10.

d. The dried top layer residue 3FOx-C1-TL was subjected to sublimation conditions similar to those described in Example 1 for 3FOx-S1-TL (165° C. at 1.0 Torr). The sublimate showed only one single sharp peak with Mn=1.3 kDa and a $PDI_2$ of 1.01, which has the same retention volume as Peak 2 observed in the other samples.

e. $^1$H -NMR spectra. $^1$H-NMR spectra were obtained for 3FOx-C1-TL, P[3FOx-C1], P[3FOx-C1-4.5], and $P[3FOx]_4$ from sublimation of 3FOx-C1-TL. The spectrum for P[3FOx-C1] is comprised of peaks for 3-methyl groups at ~0.9 ppm and methylene protons at 3-4 ppm. P[3FOx-C1] has about 48% (GPC) cyclics and LMW components so that the spectrum of the purified product P[3FOx-C1-4.5] has significant differences compared to P[3FOx-C1]. The spectrum of the sublimate from 3FOx-C1-TL (P[3FOx]$_4$), has an envelope of peaks at 3.41 ppm that are present in P[3FOx-C1] but absent in P[3FOx-C1-4.5]. These peaks are associated with cyclics. Conversely, the side chain —CH$_2$— c-protons have a single peak at 3.43 ppm for P[3FOx-C1-4.5] but this peak appears as a broadened multiplet for 3FOx-C1-TL and P[3FOx-C1] and is completely absent for the sublimate from 3FOx-C1-TL (P[3FOx]$_4$). A well-defined quartet for the main chain —CH$_2$— protons is observed for P[3FOx-C1-4.5], while the quartet for 3FOx-C1-TL and P[3FOx-C1] is not well resolved due to overlapping signals from multiple components. Interestingly, the product of sublimation from the top layer product, which was shown by mass spectroscopy to be predominantly P[3FOx]$_4$, clearly shows three methyl group a-peaks that must arise from the presence of isomers.

Example 3 a. Preparation of poly(3-methyl-3-[2,2,3,3,3-pentafluoroethyoxy)methyl]-1,3-oxetane). Synthesis of poly(3-methyl-3-[2,2,3,3,3-pentafluoroethyoxy)methyl]-1,3-oxetane) P[5FOx], 5 was carried out according to known methods (U.S. Pat. Nos. 5,703,194, 5,807,977, and 5,668,251) to give the crude product designated P[5FOx-S1].

Initial NMR end group analysis using trifluoroacetic anhydride gave Mn=2.6 kDa. GPC with a refractive index (RI) detector showed two peaks and a shoulder. From left to right, that is, from high MW to low MW, the first broad peak (Peak 1) is the main peak (78% relative area) with Mn=4.6 kDa. The polydispersity ($PDI_1$, Mw/Mn) is 1.26. The second sharp peak (Peak 2) has 20% relative area with Mn=1.5 kDa and $PDI_2$ 1.07. A shoulder is observed at Mn=0.70 kDa with a 2% relative peak area. The overall polydispersity for P[5FOx-S1] ($PDI_O$, Mw/Mn) is 1.63. These are approximate values again because of the lack of good molecular weight standard. Peak 2 is believed to correspond to cyclic tetramer, P[5Fox]$_4$, 6 as suggested earlier. (U.S. Pat. Nos. 5,703,194, 5,807,977, and 5,668,251). The narrowness of this peak ($PDI_2$ 1.07) supports this notion. There is only approximate agreement with the calculated MW of tetramer (0.936 kDa) most likely due to lack of a good molecular weight standard.

b. Liquid-liquid extraction. P[5FOx-S1] (20 grams) was mixed with 300 ml n-hexane and 200 ml methanol in a separatory funnel followed by thorough shaking. After settlement, two layers resulted: bottom layer (~300 ml) and top layer (~200 ml). The top layer is considered extracted layer 1. The layers were separated and 150 ml n-hexane and 50 ml methanol was added to the 300 ml bottom layer using a clean separatory funnel. After shaking, the layers were separated and, in a separate container, top layer 2 was added to top layer 1 (1 designates the first extracted layer and 2 designates the second extracted layer). Solvent was removed from the bottom layer and the combined top layers 1 and 2 by distillation. The bottom layer and top layer products, respectively, were dried at 60° C. under vacuum for 24 hours. The yield of lower layer product was 14 g, 70%.

c. GPc. GPC was carried out on the product that remained in the lower layer after two extractions and stripping hexane. This product is designated P[5FOx-S1-5] as end group analysis indicated Mn was 5.0 kDa. The resulting chromatogram showed that Peak 2 (lower molecular weight) of the bottom layer was reduced to ~11% of the total area. The overall P[5FOx-S1-5] $PDI_O$ was reduced to 1.60 (Table 1).

For the top layer residue designated 5FOx-S1-TL, Peak 2 became the main peak, contributing 54% of the total area under the curve. The Mn and $PDI_2$ are the same as that of the corresponding peak in the initial crude product. Peak 1 of the top layer, however, has Mn reduced to 1.5 kDa with $PDI_1$ at 1.60.

d. $^1$H NMR spectra. The pattern of the $^1$H-NMR spectra for 3FOx-S1-TL; as-prepared P[5FOx-S1]; and P[5FOx-S1-5] follows results observed for P[3FOx], with the spectrum of the purified product P[5FOx-5] reflecting removal of extracted products concentrated in the top layer. Because of the relatively low percent cyclics and other components, the spectra for P[5FOx-S1] and P[5FOx-5] have only subtle differences. Of particular note is the c-proton peak at 3.36 ppm for the top layer product that has a very weak intensity in P[5FOx-S1-5]. The spectrum of the top layer product is clearly different, having multiple overlapping peaks due to concentrated cyclics and LMW components. Thus a well-defined quartet for the main chain —CH$_2$— protons is observed for the purified P[5FOx-S1-5] and P[5FOx-S1], while the quartet for the top layer product is not well resolved due to overlapping signals. Similarly, the side chain —CH$_2$— c-protons have a single peak at 3.43 ppm for P[5FOx-S1-5] but a broadened doublet for the top layer product.

Example 4

Purification of as-received poly(3-methyl-3-[2,2,3,3,3-pentafluoroethyoxy)methyl])-1,3-oxetane). A commercially available poly(3-methyl-3-[2,2,3,3,3-pentafluoroethyoxy)methyl]-1,3-oxetane) was obtained from OMNOVA Solutions, Inc., product number POLYFOX PF-6520 (2314AM) (name designation as of 18 May 2009). This polyoxetane is designated as P[5FOx-C1].

a. GPC with a refractive index (RI) detector shows two peaks. From left to right, that is, from high MW to low MW, the first broad peak (Peak 1) is the main peak (74% relative area) with Mn=5.3 kDa. The polydispersity ($PDI_1$, Mw/Mn) is 1.12. The second peak (Peak 2) is a sharp peak and the minor peak (26% relative area) with Mn=1.5 kDa with a $PDI_2$ 1.02. The overall Mn for P[5FOx-C1] is 3.6 kDa and the overall polydispersity ($PDI_O$, Mw/Mn) is 1.34. This is an approximate number because of the lack of good molecular weight standard for GPC calibration. Peak 2 is believed to correspond primarily to the cyclic tetramer $[5FOx]_4$ as suggested earlier. The narrow peak ($PDI_2$ 1.02) supports this notion. Mn for P[5FOx-C1] determined by NMR end group analysis (discussed below) is 6.5 kDa. This is larger than the Mn determined by GPC (3.6 kDa). The difference is attributed to the presence of cyclics that do not contribute end groups and monofunctional polyoxetanes that contribute only one (not two) end groups. The result for NMR end group analysis is an apparently larger repeating unit to end group ratio in the molecular weight calculations. There is only approximate agreement with the calculated MW of tetramer (0.936 kDa) most likely due to lack of a good molecular weight standard.

b. Liquid-liquid extraction. P[5FOx-C1] (100 grams) was mixed with 240 ml n-hexane and 160 ml methanol in a separatory funnel followed by thorough shaking. After settlement, two layers resulted: bottom layer (~250 ml) and top layer (~250 ml). The top layer is considered extracted layer 1. The layers were separated and 150 ml n-hexane and 100 ml methanol was added to the 250 ml bottom layer using a clean separatory funnel. After shaking, the layers were separated and, in a separate container, top layer 2 was added to top layer 1 (1 designates the first extracted layer and 2 designates the second extracted layer). Anticipating the need for multiple extractions due to the high concentration of cyclics and other LMW components, the above procedure was repeated two more times. Solvent was removed from the bottom layer and the combined top layers 1,2,3, and 4 by distillation. The respective products from bottom layer and the combined top layers were further dried at 60° C. under vacuum for 24 hours.

c. GPC on the samples after extraction. GPC was carried out on the purified product that remained in the bottom layer after four extractions and hexane stripping. The resulting chromatogram showed that Peak 2 (lower molecular weight) of the bottom layer was reduced to ~2% of the total area. The overall $PDI_O$ for the bottom layer product was reduced to 1.15. Mn is 4.7 kDa by GPC and 5.2 kDa by NMR end group analysis. The designation P[5FOx-C1-5.2] is used for this purified product. The better agreement in Mn determined by two different methods also indicates most cyclics and LMW polyoxetanes have been eliminated.

For the top layer residue designated 5FOx-C1-TL, Peak 2 became the main peak, contributing 63% of the total area under the curve. Mn and $PDI_2$ are same as that of the corresponding peak in the as received sample. Peak 1 of the top layer, however, has a reduced Mn at 2.1 kDa (GPC) with $PDI_1$ at 1.30. NMR end group analysis, however, produces a Mn of 6.1 kDa. The disparity between Mn determined by GPC and $^1H$-NMR is due to the presence of cyclics and LMW constituents as discussed above.

d. $^1H$ NMR spectra. $^1H$ NMR spectra were obtained of P[5FOx-C1] and the P[5FOx-C1-5.2] product from the bottom layer and 5 FOxC1-TL from the top layer. The spectrum of the purified product P[5FOx-C15.2] reflects the removal of extracted products concentrated in the top later. Because of the relatively high percent of cyclics and LMW components, the spectrum for P[5FOx-C1] is similar to that of the top layer product with only subtle differences. Of particular note is the c-proton peak at 3.36 ppm for the top layer product that has a very weak intensity in P[5FOx-5.2]. The relative intensity of the c-proton also indicates the relative purity of each sample. A well-defined quartet for the main chain —$CH_2$— protons is observed for P[5FOx-C1-5.2], while the quartet for P[5FOx-C1] and the top layer product 5FOx-C1-TL is not well resolved due to overlapping signals. Similarly, the side chain —$CH_2$-c-protons have a single peak at 3.43 ppm for P[5FOx-C1-5.2] but two peaks for P[5FOx-C1] and 5FOx-C1-TL.

Example 5

HMDI-BD-P[3FOx-C1]. This polyurethane was synthesized by modification of the two step, soft block first method described in the literature. 4,4'-Dicyclohexane-diisocyanate (HMDI) and 1,4 butane diol (BD) were used for the hard segment with 3FOx diols as a soft segment precursors.

In the first step, 7 grams as received P[3FOx-C1] (equivalent to 1.94 mmol polyoxetane diol) and 2.35 grams (8.98 mmol) HMDI were added to excess HMDI in a three-neck round-bottomed flask equipped with a mechanical stirrer, nitrogen inlet, and condenser. After addition of 50 ml THF and T-12 catalyst (2 drops of 10 vol % T-12 in THF) the reactants were kept at reflux temperature (~70° C.) for 3 hr. In the second stage, 0.65 gram (7.21 mmol) of BD (diluted in 10 ml THF) was added slowly (with a metering pump or syringe pump) over a 12-hour period while keeping the reaction mixture at reflux temperature (~70° C.).

After all 1,4-BD was added, the temperature was maintained at 70° C. for 4 hours before cooling to 50° C. The polyurethane product precipitated when the reaction mixture was poured into a 500 ml methanol/water (3:1) mixture. After precipitation, the solid sample was vacuum filtered and dried in air for 2 days. The collected solid polyurethane (10 g) was dissolved in 50 ml THF and precipitated in 500 ml methanol/water (3:1) mixture for an additional purification.

GPCs for crude P[3FOx-C1] and HMDI-BD(30)/P(3FOx-C1) were compared. Even after two precipitation/reprecipitations, a low molecular weight peak corresponding to LMW components is observed. Based on the main high molecular weight peak, Mw for this HMDI-BD(30)/P(3FOx-C1) is 16 kDa. The relative area of the LMW peaks for HMDI-BD(30)/P(3FOx-C1) is greatly reduced compared to the LMW peak for P[3FOx-C1]. Thus, repreciptations effect purification but not complete removal of LMW species. The LMW peaks for HMDI-BD(30)/P(3FOx-C1) are shifted somewhat to higher molecular weight compared to P[3FOx-C1]. It appears that the cyclic content has been reduced compared to P[3Fox-C1], but other LMW polyoxetane species are present.

Plaques (0.5 mm thick) were prepared by solution casting followed by drying at 60° C. under vacuum for 24 hours. Table 2 shows the tensile test results for the polyurethanes prepared as described above. The tensile strength for HMDII-BD(30)-P[3FOx-C1] is observed at 4.5 MPa and the strain at break is 23%.

Wetting Behavior. Dynamic Contact Angle (DCA) measurements were carried out using dip-coated glass slides as described in the literature. After the DCA measurement, a check was carried out to determine whether the water was contaminated by the dip-coated slides. To carry out the check, a clean and freshly flamed slide is lowered into the post-DCA test water, and the force distance curves (fdc) are recorded like a regular DCA measurement. If the coating on the dip-coated slides has organic components which leach out and spread onto the water surface, then contact angle hysteresis is usually observed. If organic components do not leach out or if they are water soluble (and thus not concentrated on the water surface), then hysteresis is not observed, i.e., the advancing and receding fdc's overlap similar to pure water.

Coatings made of HMDI-BD(30)-P[3FOx-C1] showed varying advancing (from 108 to 99°) and receding contact angles (from 53 to 56°) for cycles 1-4. The post-DCA water check indicated water contamination, which are attributed to cyclics and LMW components present in the coated slide.

Preparation of Hybrid Coatings

The new hybrid compositions of matter described herein are comprised of (1) a fluorous polyoxetane end-capped with a —Si(OCH$_3$)$_3$ functionality for condensation cure and (2) a high strength fluorous polyurethane. The synthesis of the fluorous end-capped copolyoxetane, the fluorous polyurethane and the crosslinked polymeric network is illustrated in FIG. 2 and described below.

Example 6

Synthesis of 3FOx-polyurethane. The synthesis of the 3FOx-PU, designated U-3F, is described in this section. U-3F was synthesized by modification of the two step, soft block first method described in the literature. 4,4'-Methyl-enebis-(cyclohexylisocyanate) (HMDI) and 1,4 butanediol (BD) were used for the hard segment with 3FOx copolyoxetane 3F as a soft segment in solutions with THF.

In the first step, 7 grams (equivalent to 1.56 mmol polyoxetane diol) 3F diol (of the bottom layer from Example 2, P[3Fox-C1-4.5] and 2.34 grams (8.88 mmol) HMDI are added to excess HMDI in a three-neck round-bottomed flask equipped with a mechanical stirrer, nitrogen inlet, and condenser. After addition of 50 ml THF and T-12 catalyst (2 drops of 10 vol % DBTDL in THF), the reactants were kept at 70° C. for 3 hr to prepare diisocyanate-terminated prepolymer.

In the second stage, 0.67 gram (7.43 mmol) of BD (diluted in 10 ml THF) was added slowly (with a metering pump or syringe pump) over a 12-hour period while keep the reaction mixture refluxed at ~70° C. With slight excess of 1,4-BD, very slow addition process and relatively fast reaction rate between 1,4-BD and isocyanate, there will be sufficient reaction time in the flask when the isocyanate/hydroxyl ration is in the vicinity of 1. This ensures high molecular weight polyurethane independent of stoichiometry control and how accurately P[3FOx] molecular weight is determined. An exception results from the presence of monofunctional P[3FOx], which terminates chain growth and results in low molecular weight polyurethanes. Excess 1,4-BD is removed during the precipitation and re-precipitation process.

After BD is added, a temperature of 70° C. is maintained for 4 hours before cooling to 50° C. The desired polyurethane precipitates when the reaction mixture is poured into 500 ml methanol/water (3:1) mixture. After precipitation, the product was vacuum filtered and dried in air for 2 days. The collected polyurethane was dissolved in 50 ml THF and precipitated in 500 ml methanol/water (3:1) mixture for an additional purification.

The GPC chromatogram for the purified polyurethane was compared to P[3FOx-4.5] diol. A low molecular weight component peak is not observed for the U-3F although a shoulder can be seen. The weight average molecular weight is 110 kDa.

Coatings (0.5 mm thick) and dip-coated glass slides were prepared by solution casting followed by drying at 60° C. under vacuum for 24 hours. The tensile strength and strain at break for HMDI/BD(30)-P[3FOx-4.5], U-3F, is 9.2 MPa and 1245% elongation at break (Table 2). The striking difference is a result of difference in molecular weight and impurity level between the two polyurethanes. In summary, purification of the P[3FOx-C1] diol removes most of the cyclics and LMW components; in turn, high purity, low polydispersity P[3FOx-C1-4.5] permits careful control of stoichiometry in step growth polymerization. The higher molecular weight P[3FOx-C1-4.5] polyurethane has dramatically improved mechanical properties due to high molecular weight and negligible impurity content.

Dynamic Contact Angle (DCA) measurements were carried out using dip-coated glass slides. The advancing contact angle for the U-3F is stable for the first 3 cycles within experimental error (FIG. 14). The post-DCA water check shows no water contamination. Since a very small peak in GPC was attributable to low molecular weight polyurethane and/or cyclics), another 4 DCA cycles were carried out on the U-3F coating. Both advancing and receding contact angles remained stable. However, a post-DCA water check showed slight hysteresis in fdc's.

Example 7

HMDI-BD-3FOx-C1-TL. The top layer product of Example 2 is designated 3FOx-C1-TL. Using this product, the same procedure described in Examples 5 and 2 was used to generate a polyurethane. A modification of the two step, soft block first method described in the literature was used; 4,4'-dicyclohexane-diisocyanate (HMDI) and 1,4 butane diol (BD) were used for the hard segment, with 3FOx telechelics as a soft segment in solutions of THF.

In the first step, 7 grams (equivalent to 2.63 mmol polyoxetane diol as determined by end group analysis) of 3FOx-C1-TL from Example 3, and 2.40 grams (9.16 mmol) HMDI were added to excess HMDI in a three-neck round-bottomed flask equipped with a mechanical stirrer, nitrogen inlet, and condenser. After addition of 50 ml THF and T-12 catalyst (2 drops of 10 vol % T-12 in THF), the reactants were kept at 70° C. for 3 hr to prepare the diisocyanate-terminated prepolymer. In the second stage, 0.60 gram (6.53 mmol) of BD (diluted in 10 ml THF) was added slowly over a 12-hour period while keeping the reaction at 70° C. After all the BD is added into the flask, the reactants were kept at 70° C. for 4 hours before cooling to 50° C. and precipitating into 500 ml methanol/water (3:1) mixture for purification. Instead of forming solid particles, the product was in liquid form and formed two layers in methanol/water mixture. Another re-precipitation was performed for this product, yet a solid product is not obtained. No mechanical and dynamic contact angle testing could be performed. The inability to form a high molecular weight polymer (in the form of solid) indicates the presence monofunctional polyoxetanes in the top layers from Example 3, which terminated the step-growth reaction.

Example 8

Prepolymer synthesis of fluorous polyoxetane end-capped with —Si(OCH₃)₃. The first step involves the reaction of fluorous copolyoxetane diol P[3FOx-C1-4.5], which is designated 3F diol or 1, with isocyanate terminated trialkoxysilane 2 (FIG. 2). End capping 3F terminal hydroxyl groups via formation of urethane linkages marks completion of the first step. The second step involves addition of different weight percents U-3F polyurethane. The volume fraction of the siliceous domain is enhanced by the addition of bis(triethoxysilyl)ethane 3 (FIG. 2). Condensation cure is in moist air at ambient temperature, that is —Si(OEt)₃ condensation cure with concomitant formation of a siliceous coating component.

In a typical reaction 10 g (2.22 mmol) 3F diol 1 (FIG. 2) was added dropwise via an additional funnel to 1030 μl (4.44 mmol) 3-isocyanatopropyl triethoxysilane 2 (FIG. 2) with continuous stirring in a 250 mL reaction vessel. Each of the reactants was dissolved in THF (10 g). The reaction was carried out at room temperature (~30° C.) for 24 hours. To prevent hydrolysis of alkoxy silane 2, water the reaction was carried out under a continuous dry nitrogen purge.

The extent of reaction between terminal alcohol groups (1) and isocyanate (2) was determined by removing a small sample of the reaction mixture at successive time intervals and obtaining an IR spectrum on KBr discs. Disappearance of OH (~3500 cm$^{-1}$) and NCO (~2200 cm$^{-1}$) peaks with concurrent growth of NH (urethane, ~3300 cm$^{-1}$) confirmed the completion of step 1. Next, 0.5 wt % of DBTDA catalyst and bis(triethoxysilyl)ethane 3, 10 wt % (~1.0 ml) were added (FIG. 2). Addition of 3 served to increase the volume fraction of siliceous domain in the final product. The composition at this stage comprises a solution of INP precursor designated 5 (FIG. 2).

3F—Si/H(U-3F-x) Compositions. A THF solution of U-3F was added to INP precursor 5 to provide multiple compositions (Examples 9-16) with increasing weight percent 'x', where, x=10, 30, 40, 50, 60, 75 and 90. After U-3F addition, stirring was continued for 30 minutes to obtain a homogenous solution and to achieve an increase in viscosity from condensation polymerization. As a control, a sample of INP precursor 5 was cured without addition of U-3F. This control sample is designated 3F—Si/H.

At this stage, and for an additional 4 hours, the solution had a suitable viscosity for coating. Microscope slides were drip coated and glass cover slips were dip coated and cured at ambient overnight before completing condensation/sol-gel cure at 100° C. for 24 hr. To prepare plaques with thickness ~150 μm, the solution was spread on PTFE plates, allowed to cure overnight at ambient temperature, and cured at 100° C. for 24 hr. Preparation of 3F—Si/H and 3F—Si/H(U-3F-x) coatings with 10-90 wt % U-3F are described in Examples 9-16. Masses of reactants for Examples 4-11 are listed in Table 3.

Example 9

3F—Si/H. A solution of INP precursor 5 (FIG. 2) was synthesized as described in Example 8. Microscope slides were coated and cured at ambient for one hr followed by 100° C. overnight to ensure complete cure. The cured composition designated 3F—Si/H does not contain U-3F and provides a control.

Example 10

3F—Si/H(U-3F-10). A solution of INP precursor 5 (FIG. 2) was synthesized as described in Example 8. To the INP precursor 3 (2 g), dissolved in THF was added 0.2 g of 4 and 0.5 wt % of DBTDA catalyst leading to INP precursor 5. To the resulting solution was added 0.22 g U-3F dissolved in THF. The resulting solution was stirred for 30 minutes prior to coating microscope slides. The coated slides were kept at 100° C. overnight to ensure complete cure.

Example 11

3F—Si/H(U-3F-30). A solution of INP precursor designated 5 (FIG. 2) was synthesized as described in Example 8. To the INP precursor 3 (2.2 g), dissolved in THF was added 0.22 g of 4 and 0.5 wt % of DBTDA catalyst leading to INP precursor 5. To the resulting solution was added 0.94 g U-3F dissolved in THF. The resulting solution was stirred for 30 minutes prior to coating microscope slides. The coated slides were kept at 100° C. overnight to ensure complete cure.

Example 12

3F—Si/H(U-3F-40). A solution of INP precursor designated 5 (FIG. 2) was synthesized as described in Example 8. To the INP precursor 3 (2.2 g), dissolved in THF was added 0.22 g of 4 and 0.5 wt % of DBTDA catalyst leading to INP precursor 5. To the resulting solution was added 1.46 g U-3F dissolved in THF. The resulting solution was stirred for 30 minutes prior to coating microscope slides. The coated slides were kept at 100° C. overnight to ensure complete cure.

Example 13

3F—Si/H(U-3F-50). A solution of INP precursor designated 5 (FIG. 2) was synthesized as described in Example 8. To the INP precursor 3 (2.2 g), dissolved in THF was added 0.22 g of 4 and 0.5 wt % of DBTDA catalyst leading to INP precursor 5. To the resulting solution was added 2.2 g U-3F dissolved in THF. The resulting solution was stirred for 30 minutes prior to coating microscope slides. The coated slides were kept at 100° C. overnight to ensure complete cure.

Example 14

3F—Si/H(U-3F-60). A solution of INP precursor designated 5 (FIG. 2) was synthesized as described in Example 8. To the INP precursor 3 (2.2 g), dissolved in THF was added 0.22 g of 4 and 0.5 wt % of DBTDA catalyst leading to INP precursor 5. To the resulting solution was added 3.3 g U-3F dissolved in THF. The resulting solution was stirred for 30 minutes prior to coating microscope slides. The coated slides were kept at 100° C. overnight to ensure complete cure.

Example 15

3F—Si/H(U-3F-75). A solution of INP precursor designated 5 (FIG. 2) was synthesized as described in Example 8. To the INP precursor 3 (2 g), dissolved in THF was added 0.2 g of 4 and 0.5 wt % of DBTDA catalyst leading to INP precursor 5. To the resulting solution was added 6 g U-3F dissolved in THF. The resulting solution was stirred for 30 minutes prior to coating microscope slides. The coated slides were kept at 100° C. overnight to ensure complete cure.

Example 16

3F—Si/H(U-3F-90). A solution of INP precursor designated 5 (FIG. 2) was synthesized as described in Example 8. To the INP precursor 3 (2.2 g), dissolved in THF was added 0.22 g of 4 and 0.5 wt % of DBTDA catalyst leading to INP precursor 5. To the resulting solution was added 19.8 g U-3F dissolved in THF. The resulting solution was stirred for 30 minutes prior to coating microscope slides. The coated slides were kept at 100° C. overnight to ensure complete cure.

Example 17

U-3F. To obtain a control coating of neat 3F—U, 2 g of the linear 3FOx-PU was added to 20 ml of THF and was stirred until a homogenous solution was obtained. Microscope slides were coated and kept at 100° C. overnight to ensure complete removal of solvent.

Example 18

3FOx-(3.6)-UUr-Si(9). 3FOx-(3.6)-UUr-Si(9) was prepared by a two-step polymerization method. In the first stage, 10 g P(3FOx)-C1 (MW 3600 g/mol), 1.46 ml 4,4'-Methylenebis(cyclohexyl isocyanate) (MW 262.35 g/mol) (NCO/OH=2:1) and 25 ml reagent grade tetrahydrofuran (THF) were mixed in flask. The flask was then sealed and mechanically stirred for 5 minutes. Two drops of dibutyltin dilaurate THF solution (10% by volume) were added into the solution. Then the flask was sealed again and kept at 60° C. in oven for 16 hr.

In the second stage, 1.23 ml 3-aminopropyltriethoxysilane (MW 221.37 g/mol) was added after the solution was cooled down to room temperature. Then the solution was stirred for 2 min. Coatings were made immediately onto microscope slides or aluminum panels. The coatings were cured in room temperature for 24 hr and at 60° C. for another 24 hr.

Dynamic contact angle analysis: This test was performed with water as the probe liquid on the coated slides over 4 cycles. The $\theta_A$ values are 111.6°, 111.1°, 109.8° and 107.9° while the $\theta_R$ values are 47.5°, 49.0°, 50.1° and 51.4° respectively. The fdc's are overlapping which shows no water contamination and establishes stability of these coatings in water.

Abhesion test: This test was performed on the coatings and the peak removal shear stress ECR-P was 0.074 MPa. The removal energy, ECR-E which is the area under the abhesion stress-distance curve, is 9.56 J/m²

Mechanical Properties:

Tensile: The tensile test was done using a TA Instrument RSA 3 dynamical mechanical analyzer under tensile mode. The strength is found at 1.24 MPa and the elongation at break is 80%

DMA: The DMA analysis was done using a TA Instrument RSA 3 dynamical mechanical analyzer under dynamic mode. The storage and loss modulus are 3.24 MPa and 0.43 MPa at room temperature at 1 Hz.

DSC: Differential scanning calorimetry was done using a TA Instruments Q1000 MDSC and the glass transition temperature was found at −35° C.

TGA: Thermal stability was assessed by TGA in nitrogen. Degradation temperature was found 430° C.

Example 19

5FOx-(4.7)-UUr-Si(8). 5FOx-(4.7)-UUr-Si(8) was prepared by a two-step polymerization technique. In the first stage, 5 g poly-5FOx (MW 4700 g/mol), 0.61 ml 4,4'-Methylenebis(cyclohexyl isocyanate) (MW 262.35 g/mol) (NCO/OH=2:1) and 25 ml reagent grade tetrahydrofuran (THF) were mixed in flask. The flask was then sealed and mechanical stirred for 5 minutes. Two drops of Dibutyltin dilaurate THF solution (10% by volume) were added into the solution. Then the flask was sealed again and kept at 60° C. in oven for 18 hr.

In the second stage, 0.54 ml 3-aminopropyltriethoxysilane (MW 221.37 g/mol) was added after the solution was cooled down to room temperature. Then the solution was stirred for 2 min. Coatings were made immediately onto microscope slides or aluminum panels. The coatings were cured in room temperature for 24 hr and at 60° C. for another 24 hr.

Abhesion test: This test was performed on the coatings and the peak removal shear stress ECR-P was 0.161 MPa. The abhesion removal energy ECR-E, which is the area under the abhesion stress-distance curve, is 35.43 J/m²

Example 20

3FOx-(3.6)-UUr-Si(5). 3FOx-(3.6)-UUr-Si(5) was prepared by a two-step polymerization technique. In the first stage, 1.46 ml 4,4'-Methylenebis(cyclohexyl isocyanate) (MW 262.35 g/mol), two drops of dibutyltin dilaurate THF solution (10% by volume), and 25 ml reagent grade tetrahydrofuran (THF) were mixed in three-neck round bottom flask equipped with a mechanical stirrer, nitrogen inlet and outlet, addition funnel, and condenser. The solution was heated up to boiling point at about 68° C. Then 10 g poly-3FOx (MW 3600 g/mol) (OH/NCO=1:2) dissolved in 40 ml THF was drop wisely added into the flask using the addition funnel. The dropwise addition took around 3 hrs. After the addition process completed, the reaction mixture was kept in boiling point for 12 hr.

In the second stage, 0.62 ml 3-aminopropyltriethoxysilane (MW 221.37 g/mol) was added after the solution was cooled down to room temperature. Then the solution was stirred for 5 min. Coatings were made immediately onto microscope slides or aluminum panels. The coatings were cured in room temperature for 24 hr and followed at 60° C. for one week until the surface was not tacky.

Dynamic contact angle analysis: This test was performed with water as the probe liquid on the coated slides over 3 cycles. The $\theta_A$ values are 113.1°, 113.4° and 112.4° while the $\theta_R$ values are 43.6°, 45.5° and 47.4° respectively. The fdc's of flamed glass slide were not overlapping which shows water contamination is observed.

Abhesion test: This test was performed on the coatings and the peak removal shear stress ECR-P was 0.18 (±0.09) MPa. The abhesion removal energy ECR-E, which is the area under the abhesion stress-distance curve, is 60 (±40) J/m²

Example 21

3FOx-(4.5)-UUr-Si(8). 3FOx-(4.5)-UUr-Si(8) was prepared by a two-step polymerization method in air. In the first stage, 15 g purified P[3FOx-C1-4.5] (MW 4500 g/mol), 1.73 g 4,4'-Methylenebis(cyclohexyl isocyanate) (MW 262.35 g/mol) (NCO/OH=2:1) and 35 ml reagent grade tetrahydrofuran (THF) were mixed in 250 mL flask. The flask was then sealed and mechanically stirred for 5 minutes. Two drops of dibutyltin dilaurate THF solution (10% by volume) were added into the solution. Then the flask was sealed again and kept at 60° C. in oven for 16 hr.

In the second stage, 1.46 g 3-aminopropyltriethoxysilane (MW 221.37 g/mol) was added after the solution was cooled to room temperature. Then the solution was stirred for 2 min. Coatings were made immediately onto microscope slides or aluminum panels. The coatings were cured in room temperature for 24 hr and at 60° C. for another 24 hr.

Dynamic contact angle analysis: This test was performed with water as the probe liquid on the coated slides over 4 cycles. The $\theta_A$ values are 118.3°, 116.5°, 116.0° and 115.0° while the $\theta_R$ values are 39.37°, 38.98°, 38.99° and 38.76° respectively. The fdc's are overlapping which shows no water contamination and establishes stability of these coatings in water.

Abhesion test: This test was performed on the coatings and the peak removal shear stress ECR-P was 0.18 MPa. The abhesion removal energy ECR-E, which is the area under the abhesion stress-distance curve, is 85 J/m$^2$.

Example 22

5FOx-(5.2)-UUr-Si(7). Purified UUrSil-5FOx was prepared by a two-step polymerization technique. In the first stage, 5 g purified poly-5FOx (MW 5200 g/mol), 0.50 ml bis(p-cyclohexyl isocyanate) (MW 262.35 g/mol) (NCO/OH=2:1) and 15 ml reagent grade tetrahydrofuran (THF) were mixed in flask. The flask was then sealed and mechanical stirred for 5 minutes. Two drops of Dibutyltin dilaurate THF solution (10% by volume) were added into the solution. Then the flask was sealed again and kept at 60° C. in oven for 18 hr.

In the second stage, 0.47 ml 3-aminopropyltriethoxysilane (MW 221.37 g/mol) was added after the solution was cooled down to room temperature. Then the solution was stirred for 2 min. Coatings were made immediately onto microscope slides or aluminum panels. The coatings were cured in room temperature for 24 hr and at 60° C. for another 24 hr.

Abhesion test: This test was performed on the coatings and the peak removal shear stress ECR-P was 0.24 MPa. The abhesion removal energy ECR-E, which is the area under the abhesion stress-distance curve, is 35.4 J/m$^2$.

Example 23

Preparation of block copolyoxetane of 3-methyl-3-[2,2,3,3,3-pentafluoroethyoxy)methyl]-1,3-oxetane (3FOx) and 3-(Methoxyethoxyethoxymethyl)-3-methyloxetane (ME2Ox). (3FOx-b-ME2Ox)-75:25-4.7. Synthesis of (3FOx-b-ME2Ox)-75:25-4.7 was carried out according to known methods (U.S. Pat. Nos. 7,842,388, 5,703,194, 5,807,977, and 5,668,251), but in by a two-step polymerization procedure. 40 mmol (8.16 grams) of ME2Ox monomer was gradually added into the reaction flask first to produce P[ME2Ox] with active chain end, then 120 mmol (22.08 grams) 3FOx monomer was then gradually added to the reaction flask. Reaction was kept at −5° C. for 12 hour after all monomers are added. NMR end group analysis showed number average molecular weight as 4700 g/mol. Polydispersity from GPC results is 1.61.

Example 24

(3FOx-b-ME2Ox)-75:25-4.7-UUr-Si(8). (3FOx-b-ME2Ox)-75:25-4.7-UUr-Si(8) was prepared by a two-step polymerization technique by using (3FOx-b-ME2Ox)-75:25-4.7 synthesized as described in Example 23. In the first stage, 0.60 ml 4,4'-methylenebis(cyclohexyl isocyanate) (MW 262.35 g/mol) and 25 ml reagent grade tetrahydrofuran (THF) were mixed in three-neck round bottom flask equipped with a mechanical stirrer, nitrogen inlet and outlet, addition funnel, and condenser. The solution was heated to reflux temperature, ~68° C. Then 5 g poly-(3FOx-block-ME2Ox) (MW 4700 g/mol) (NCO/OH=2:1) dissolved in 40 ml THF was added drop wise into the flask using the addition funnel. The drop wise addition took around 3 hr. After the addition process completed, the reaction mixture was refluxed for 12 hr.

In the second stage after the solution was cooled down to room temperature 0.50 ml 3-aminopropyltriethoxysilane (MW 221.37 g/mol) was added. Then the solution was stirred for 5 min. Coatings were made immediately onto microscope slides or aluminum panels. The coatings were cured in room temperature for 24 hr and followed at 60° C. for one week until the surface was not tacky.

Dynamic contact angle analysis: This test was performed with water as the probe liquid on the coated slides over 3 cycles. The $\theta_A$ values are 129.5°, 100.3° and 99.6° while the $\theta_R$ values are 57.9°, 59.2° and 62.1° respectively. The fdc's of flamed glass slide were not overlapping which shows some water contamination is observed. However, the rapid decrease in $\theta_A$ values is likely due to surface hydration/rearrangement.

Abhesion test: This test was performed on the coatings and the peak removal shear stress ECR-P was 0.05 (±0.01) MPa. The abhesion removal energy ECR-E, which is the area under the abhesion stress-distance curve, is 15 (±4) J/m$^2$. FIG. 2 shows one example of the abhesion test where 0.032 MPa of peak removal force and 8 J/m$^2$ of abhesion removal energy were observed.

Results and Discussion

The nanoscale, mesoscale, and microscale regions, sometimes referred to herein as surface, middle, and bulk regions have been implemented in a hybrid coating comprised of components depicted in FIG. 3. The soft near surface domain is comprised of a hybrid siliceous inorganic network polymer (INP). Bulk toughening is affected by a linear polyurethane HMDI/BD(30)—P[3FOx-4.5] designated "U-3F". Details on composition and processing are described followed by characterization of bulk and surface properties.

First generation elastomeric coatings are based on 1, poly(3-trifluoroethoxy-methyl-3-methyl-oxetane) diol designated "3F" (FIG. 2). Characterization of bulk properties are discussed first, including thermal transitions, mechanical properties, and susceptibility to swelling by a hydrocarbon oil (hexadecane). Secondly, surface properties are examined by ATR-IR spectroscopy and wetting behavior. Finally, a new test for abhesion is introduced that involves removal of an aluminum cylinder bonded to the coating with epoxy adhesive. The innovative part of this test is the facile determination of energy of removal in addition to peak removal force.

Implementation of Coating Design. The soft block precursor for both INP and U is 3F diol 1 (FIG. 2). As the fluorous polymer ("P") component of the INP, concentration of —CF$_3$ moieties at the coating surface is aimed at a surface with a low work of adhesion. The 3F soft block is the "soft" organic component of the INP (FIG. 3).

INP Precursors 3 and 5 The reaction sequences for the INP reactive precursors are shown in FIG. 2. Common to all coatings, reaction of 3F diol 1 and isocyanate 2 in THF is carried out under nitrogen purge at near ambient temperature (~30° C.) to prevent premature alkoxide hydrolysis. The reaction of polyol 1 with isocyanate 2 followed the approach developed by Saegusa and Chujo.[28,29]

The formation of INP precursor 3 was monitored by IR spectroscopy. The FTIR spectrum for 1 has a broad peak at 3500 cm$^{-1}$ characteristic of terminal O—H for the 3F diol.

The spectrum for 2 has a peak at 2200 cm$^{-1}$ confirming the presence of isocyanate.[31] The spectrum at time (t=0) after mixing 1 and 2 has the expected OH and NCO peaks. The IR spectrum after 24 hr shows the absence of NCO and OH peaks and the presence of amide NH (3300 cm$^{-1}$). This finding confirms the formation of INP precursor 3 with end-capped alkoxy silane moieties.

The volume fraction of siliceous domain was increased by introducing 10 wt % 1,2-bis(hexaethoxysilyl)ethane 4 ("BTESE") to generate INP precursor 5. Preliminary experiments suggested the siliceous weight fraction from end group —Si(OC$_2$H$_5$)$_3$ was insufficient to stabilize the 3F nanosurface. As a result, the volume fraction of siliceous domain was increased by introducing 10 wt % 1,2-bis(hexaethoxysilyl)ethane, BTESE, 4 to generate precursor solution 5. BTESE has been used in the preparation of porous oxycarbosilane spin-on low dielectric thin films but not as a precursor for hybrids. The choice of BTESE for increasing the weight fraction of siliceous domain was based on preliminary experiments which demonstrated negligible volatilization during cure (b.p. 119° C.) and has good hydrolysis/condensation reactivity. For BTESE, Si$_2$(CH$_2$)$_2$O$_3$ is the nominal composition after hydrolysis/condensation according to the equation:

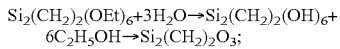

and for brevity herein, the hydrolysis/condensation cure product is designated "siliceous" and represented as "—SiO$_{1.5}$".

Condensation polymerization was initiated by terminating the nitrogen purge and adding 0.5 wt % DBTDA catalyst. As a control, a crosslinked hybrid coating was made without addition of U-3F, polyurethane 6. This composition is designated 3F/Si—H-10. The weight percent 4 is the same in all hybrid coating compositions. To simplify designations, "3F—Si/H" will be used for the hybrid 3F composition. For example, 3F—Si/H(U-3F-40) is the hybrid composition consisting of the 3F—Si—H-10 siliceous component together with 40 wt % U-3F.

U-3F. Polyurethanes containing 1 were prepared following a modification of routes described previously.[32,33] To optimize molecular weight for maximum mechanical properties and to avoid water contamination that can confound contact angle determinations, 3F diol was purified by liquid-liquid extraction with hexane to remove cyclics and low molar weight (LMW) species. A two step process was used to prepare polyurethane 3F—U. The first step was addition of 3F diol to HMDI (THF, 70° C.). In the second stage, BD was added slowly with a metering pump or syringe pump over a 12-hr period. With slow addition and a relatively fast reaction rate between BD and isocyanate, high molecular weight polyurethane is obtained. 3F—U was isolated by precipitation into methanol/water (3:1), which was used for an additional reprecipitation.

The GPC for U-3F (FIG. 2) was compared to the 3F diol 1. The peak due to residual cyclics and LMW species seen in the GPC for 3F at a retention volume of 16 ml is negligible for U-3F. M$_w$ for U-3F is 110 kDa. The tensile strength and strain at break for U-3F are 9.2 MPa and 1245%, respectively. 3F—U dip-coated coverslips were used for dynamic contact angle (DCA, Wilhelmy plate) measurements. Contact angles were stable for 4 cycles (θ$_{adv}$=109±1°; θ$_{rev}$=70±1° with no water contamination being observed in a post-DCA water check.

3F—Si/H(U-3F-x) crosslinked hybrid networks. Polyurethane 6, U-3F, was added to INP precursor 5. The solution was stirred for 30 min to initiate crosslinking and build viscosity to facilitate casting and dip or drip coating. After condensation cure in air (25/100° C.) 3F—Si/H(U-3F-x) hybrid network coatings are formed where x is the wt % 6 (FIG. 2). The coatings have a slight haze but are essentially optically transparent. Coatings on microscope slides were immersed in water for several days without delaminating. Excellent adhesion to glass and aluminum, depicted in FIG. 3, is attributed to bonding of intermediates in the hydrolysis/condensation polymerization of silyl alkoxides.

Bulk Characterization.

Differential Scanning Calorimetry. MDSC was carried out. The control hybrid 3F—Si/H has a T$_g$ for 3F at −45° C. The T$_g$ for 3F is virtually identical to that for the 3F diol (−47° C.).[27] Polyurethane 3F—U has a 3F soft block T$_g$ at −35° C. and a hard block T$_m$ at 128° C. with a modest ΔH$_m$ (3.4 J/g). The 3F T$_g$ for U-3F is 12° C. above that for the 3F diol indicating good phase separation.[27]

3F-Si/H(U-3F-50) is the threshold composition for detecting a hard block T$_m$ in the hybrid elastomer (117° C., ΔH$_m$, 0.94 J/g, Table 3). For compositions with higher wt % U-3F, T$_m$ occurs at approximately the same temperature. The wt % HMDI-BD hard block for 3F—Si/H(U-3F-50) is 15%, half that of 3F—U (30 wt %). The ΔH$_m$ (0.94 J/g) is ~30% that of neat U-3F, which has a T$_m$ about 10° C. higher than the hybrid compositions (Table 3).

In summary, 3F—Si/H(U-3F-x) hybrid elastomers with greater than 40 wt % U-3F have a separate hard block phase. However, the volume fraction of this phase is about ⅓ that for neat U-3F. Nevertheless, it is interesting that despite the 3F—Si/H-10 siliceous network the HMDI-BD hard block phase separates.

Glass transition temperatures are often difficult to detect in DSC due to small endotherms associated with the second order glass to rubbery transition. As discussed above, the T$_g$ for the 3F soft block is easily identified. Thermal transitions that are associated with the hard block, which has a much lower weight percent compared to the soft block, are assigned to changes in slope in some of the thermograms in the vicinity of 80° C. These assignments (Table 3) are tentative and are the subject of continuing investigations. Surprisingly, even low weight percents of U-3F result in compositions that display hard block T$_g$'s. The 10% and the 30% 3FOx-PU show a higher T$_g$ at 85 and 102° C., respectively.

Tensile Mechanical Properties. Coatings were obtained for 3F—Si/H and 3F—Si/H(U-3F-20) compositions, but plaques were easily fractured precluding mechanical property measurements. 3F—Si/H(U-3F-30) was the strength threshold for obtaining tensile mechanical property measurements (Table 3). 3F-Si/H(U-3F-30) had a strain-to-break of 47%. On further increasing U-3F content to 3F-Si/H(U-3F-40), a remarkable improvement in toughness was observed with a strain-to-break of 490%. For hybrid compositions with U-3F≥40 wt %, toughness increased with increasing wt % U-3F. The mechanical properties for 3F—Si/H(U-3F-90) were comparable to neat U-3F; samples did not break in the tensile test up to the strain limit of ~1200%.

Dynamic Mechanical Analysis.

DMA measurements were carried out to probe retention of mechanical properties at elevated temperatures. Again, samples for the 3F—Si/H control and 3F/H(U-3F-10) were too fragile to test.

DMA was carried out for 40 and 50 wt % U-3F films. All compositions are glassy below Tg with storage moduli of ~10$^{10}$ Pa. Above the 3F Tg that ranges from −40 to −50° C.

depending on composition (Table 3), the storage moduli decrease about 100 fold over a 40° C. interval. The onset of a long rubbery plateau with a storage modulus of ~$10^6$ Pa begins at 0° C. The long plateau suggests a broad use temperature. Storage moduli for all compositions at 0 and 100° C. are listed in Table 3.

DMA results (not shown) show that there is a broad rise in tan δ but no distinct thermal transition for 3F—Si/H(U-3F-40) above 100° C. Increased 3F—U content for 3F—Si/H(U-3F-50) results in a tradition centered at 130° C. that corresponds to the endotherm in DSC and is assigned to hard block melting. Above the hard block Tm, the modulus drops by another order of magnitude.

Surface Characterization. TM-AFM images for 3F—Si/H(U-3F-x) coatings were obtained to investigate topology and morphology for these novel hybrid systems. An entire set of AFM images are provided in Supplemental Information (Figures S2-S9). Selected images are presented in FIGS. 10 and 11. Previously other alkoxysilanes have been used for condensation cure. However, mass loss and/or delayed onset of surface features were observed.[34,Uilk,2000 #5932]Bis(hexaethoxysilyl)ethane 4, was chosen to augment the siliceous domain because it is a single chemical compound that is nonvolatile.

3F—Si/H. TM-AFM of 3F—Si/H was investigated to compare surface morphological changes resulting from the addition of 3F—U. TM-AFM images for 3F—Si/H ($r_{sp}$=0.95). Images at harder tapping ($r_{sp}$=0.8) are similar (Figure S2). The 50×50 µm phase image reveals a remarkably complex near surface morphology. These features are an apparent result of phase separation and shrinkage during condensation cure. There may be a synergy resulting from hydrogen bonding between the urethane and remainder —Si—OH groups that underlies this complex morphology.

3F—S1/H(U-3F-x). Figures S2-S9 contain a complete set of TM-AFM images for 3F—Si/H(U-3F-x) compositions. Including only 10 wt % 3F—U results in a dramatic change in near surface morphology. F—Si/H(U-3F-10) has a much less complex surface morphology with only fine grained features noticeable in the 10×10 µm ($r_{sp}$=0.95) 2D and phase images. Only one set of images is shown as the entire set of phase and 2D height images are virtually featureless (Figure S3).

Like 3F—Si/H(U-3F-10), hybrid compositions with higher 3F—U weight percents generally have much less complicated near surface morphologies compared to 3F—Si/H. A pattern of fine micron scale features are seen in the 50×50 µm images as well as nanoscale phase separated domains in the 2×2 µm images. For a comparable scan area, surface roughness ($R_q$) is less for 3F—Si/H(U-3F-x) hybrids compared to 3F—Si/H.

The images for 3F—Si/H(U-3F-40) and 3F—Si/H(U-3F-50) were relatively featureless surfaces. Nanoscale features, $r_{sp}$=0.8, are attributed primarily to near surface siliceous domains, as surface depletion of U-3F is shown by ATR-IR (vida infra). Darker colored patches similar to the 30% hybrid coatings are also observed here for smaller scan sizes. The 50% hybrids show a very smooth surface with very faint or no features at softer tapping whereas hard tapping shows a phase mixed near surface morphology.

3F—Si/H(U-3F-60) coatings are exceptional in showing high surface roughness and a very well segregated near surface morphology (Figure S7). Perhaps some as yet not understood variation in coating deposition accounts for this exceptional surface morphology. Smaller scan sizes show a phase mixed near surface morphology.

The 3F—Si/H(U-3F-75) coating shows strand like near surface features that are well dispersed throughout the phase image. These features are observed to be more prominent at softer tapping rather than hard tapping, signifying that they are more predominant at the near surface. For harder tapping at the nanoscale, some signs of phase separation are observed.

The 3F—Si/H(U-3F-90) coating shows a fair amount of phase separation at both the microscale and the nanoscale having distinct light and dark colored regions throughout the phase image. These AFM images are very much analogous to those for the neat 3FOx polyurethane signifying the fact that most of the near surface of 3F—Si/H(U-3F-90) is dominated by the linear 3FOx-PU. 3F—Si/H(U-3F-90) coatings have relatively high Rq values.

ATR-IR Spectroscopy. Attenuated total reflection infrared (ATR-IR) spectroscopy using a Ge crystal gives us a qualitative idea of the surface functionalities to a depth of ~700 nm. ATR-IR spectra were obtained for all compositions. A spectrum for 3F—Si/H(U-3F-40) shows the expected carbonyl peak at 1700 $cm^{-1}$, NH peak at ~3300 $cm^{-1}$ and CF stretching modes at 1160 and 1280 $cm^{-1}$.

The ATR-IR study was done in order estimate the near surface concentration of urethane moieties. The area of the CO peaks was measured for each of the composition, normalized with respect to the peak area for the neat U-3F. It is seen that for compositions ranging from 40% to 75% 3FOx-PU, the carbonyl peak area is 0.3-0.34 times the area for the neat polyurethane, i.e., the number of urethane groups at the surface for these compositions is one-third as compared to that of the neat U-3F. Even the 90%-3FOx-PU hybrid coating has a normalized peak area of ~0.5 which shows that the presence of even 10 wt % of the prepolymer is able to capture 50% of the urethane moieties in the bulk and prevent them from concentrating at the near surface.

Dynamic Contact Angles DCA measurements were done to analyze the surface wetting characteristics of the hybrid polymeric coatings. To determine hydrophobicity of the coated surfaces, water was used as the probe liquid. Completely overlapping force-distance curves (fdc) observed for 3F—Si/H and 3F—Si/H(U-3F-40) demonstrated that there were no leachable components from the coating and the surface tension of water remained unaltered after running a coated slide (no water contamination).

FIG. 15 shows that the advancing contact angles for all the other hybrid compositions are between 102° and 112°, less than that for the neat U-3F. FIG. 15 shows that except for the 3F—Si/H(U-3F-30), all the other hybrid compositions have shown a fairly constant contact angle hysteresis of ~50°. The 0%-3FOx-PU has shown a $\theta_{adv}$ of 110 degrees and a $\theta_{rec}$ of 63 degrees. Three consecutive cycles were run with each sample and the fdc's overlap each other, which further signify no water contamination. The advancing contact angles for each of the hybrid compositions have shown that the near surface has a considerable hydrophobic character. This result can be attributed to the fact that the near surface has a The oil uptake by these coatings in comparison to PDMS was investigated by taking selecting the 40%-3FOx-PU composition. After immersing the coated slides in hexadecane for 24 hours it was observed that the 40%-3FOx-PU absorbed 5.1% of hexadecane while the neat PDMS coated slide absorbed 35.5% of hexadecane. This remarkable difference in oil uptake between the 40% hybrid coating and PDMS can be attributed to the fact that the presence of a certain fraction of fluorous moieties at the surface acts as a barrier to the diffusion of hexadecane into the matrix.

Sessile drop measurement. The static contact angle was also measured for these hybrid polymers and the values have been plotted in FIG. 15. High contact angles have been observed for the 0%, 10% and the 30% hybrid coatings. The static contact angle values follow a similar trend as compared to the advancing contact angles measured by DCA. A minimum in the static contact angle curve is reached for the 50% and 60% hybrid coatings with values of 98° and 97° respectively. The contact angle value increases again with an increase in the weight percent of the linear 3FOx-PU in the bulk matrix. Overall these measurements suggest that these coatings have a hydrophobic near surface with the extent of hydrophobicity varying with the weight percent of linear polyurethane in the matrix.

Abhesive Surface test. An abhesion test was developed using a TA RSA-III dynamic mechanical analyzer. This test gives peak force for "epoxied aluminum cylinder removal" (ECR-P) but also ECR energy (ECR-E). The ECR test was used for all hybrid compositions and U-3F. All hybrid compositions including 3F—Si./H were tested. That is, although plaques of 3F—Si/H and 3F—Si/H(U-3F-10) tore easily and were too fragile for tensile and DMA tests, the coated slides could be tested by ECR.

3F—Si/H had a peak removal force at 0.046 MPa (FIG. 16, Table 5). With incorporation U-3F, the peak removal stress ECR-P increased to 0.093 MPa for 3F—Si/H(U-3F-10) and 0.094 MPa for 3F—Si/H(U-3F-30). Unexpectedly, increasing U-3F weight percent resulted in a reversal of the trend and a minimum in ECR-P of 0.068 MPa for 3F—Si/H(U-3F-40). The ECR-P of 0.078 MPa for 3F—Si/H(U-3F-50) is slightly higher at but ECR-E, the removal energy, is the minimum observed for all hybrid coatings (5.1 J/m$^2$). For 3F—Si/H(U-3F-60), ECR-P (0.14 MPa) and ECR-E (37.1 J/m$^2$) are increased substantially. ECR-P and ECR-E are similar for 60 and 80 wt % U-3F hybrids, but a jump in removal force (0.46 MPa) and energy (133 J/m$^2$) is observed for 3F—Si/H(U-3F-90).

The minimum for the ECR-P and ECR-E in the 40-50% U-3F range is an important and non-obvious result (FIG. 16 and Table 5). ATR-IR results show an unexpected depletion of U-3F in the coating near surface (FIG. 13). In a way that is not clear, hybrid coatings with 30-75% U-3F have depleted concentrations at the depth interrogated by ATR-IR with a Ge crystal (700 nm). From DSC, hard block phase separation is observed at the threshold concentration of 40-50 wt % U-3F. Hard block phase separation is coincident with compositions having increased strength (Table 4). Finally, wetting behavior determined by dynamic and static contact angle measurements (FIG. 15, Table 5) fall in a narrow range fairly independent of composition. This is consistent with an outermost surface composition dominated by the 3F soft block.

CONCLUSION

Characterization of hybrid coatings with 40-60% U-3F suggest that the near-surface compositional profile parallels the physical model for nanoscale, microscale, and mesoscale gradation for abhesive coatings based on FIG. 1. The combination of compositional and morphological features illustrated in FIG. 3 is suggested by contact angle measurements (A) and ATR-IR (B, C). Surprisingly good bulk mechanicals were confirmed by tensile and dynamic mechanical tests. Good adhesion to substrate (glass, aluminum) was not the subject of an engineering test. Qualitatively, coated aluminum panels were immersed in water and sea water followed by visual inspection. No sign of coating detachment was observed. Similarly, coated glass slides were immersed in water for several days without coating detachment.

The resistance to oil uptake is an important aspect of these fluorous hybrid coatings. Our results demonstrate that surface and bulk properties can be independently controlled through a hybrid coating formulation. The formulation scheme for this class of hybrid coatings offers a wide scope of compositions.

Considering the model in FIG. 3 and the compositional model in FIG. 16, a list below provides an additional scope of compositions for hybrid coatings:

| 1, low glass transition tempertaure diol | 2, isocyanate/alkoxide | 4, nonvolatile alkoxide | 6, polyurethane: |
|---|---|---|---|
| Fluoro-oxetane diol | Trimethoxy(3-isocyanatopropyl)silane | Bis(triethoxysilyl)methane | commercial linear |
| Polydimethylsiloxane diols | | Bis(triethoxysilyl)octane | polyurethanes (TPUs) that |
| Polyisobutylene diols | | 1,4-bis(triethoxysilyl)-benzene | are solution processable |
| Polyisoprene diols | | | |

The adhesion of ice to surfaces on structures such as aircraft wings, ships, wires, offshore platforms, wind turbines and telecommunication equipment often hinders operation or even poses severe dangers. A potential application for the new hybrid coatings is in ice release. It is well known that water expands when it freezes. Thus, in addition to ordinary chemical bonding (van der Walls, hydrogen bonding, ionic forces, and covalent bonding) that contributes to bonding of ice to surfaces,[35] the expansion of ice can mechanically lock the ice to the surface. The combination of the hydrophobic nature of the new hybrid coatings with low glass transition temperature (surface flexibility) and low mechanical modulus at the surface may make these new coatings ideal in ice release applications.

TABLE 1

Purity and molecular weights of P[3FOx] and P[5FOx] polyoxetanes.

| Poly-oxetane designations | $M_n$ (NMR) kDa | GPC Overall | | GPC Peak 1 | | GPC Peak 2 | | Percent diol purity[d] |
|---|---|---|---|---|---|---|---|---|
| | | $M_n$ kDa | $PDI_O$ $M_w/M_n$ | $M_n$ kDa | $PDI_1$ $M_w/M_n$ | $M_n$ kDa | $PDI_2$ $M_w/M_n$ | |
| P[3FOx-S1][a] | 10.0 | 5.5 | 2.58 | 10.1 | 1.61 | 1.3 | 1.01 | 89 |
| P[3FOx-S1-11] | 11.0 | 9.0 | 1.80 | 9.9 | 1.67 | 1.3 | 1.01 | 99[e] |
| 3FOx-S1-TL[b] | 7.1 | 1.9 | 2.72 | 4.5 | 2.08 | 1.3 | 1.01 | NA |
| P[5FOx-S1] | 2.6 | 2.9 | 1.63 | 4.6 | 1.26 | 1.3 | 1.07 | 78 |
| P[5FOx-S1-5] | 5.0 | 3.3 | 1.60 | 4.8 | 1.27 | 1.5 | 1.04 | 89[f] |

TABLE 1-continued

Purity and molecular weights of P[3FOx] and P[5FOx] polyoxetanes.

| Poly-oxetane designations | GPC Overall $M_n$ (NMR) kDa | $M_n$ kDa | $PDI_O$ $M_w/M_n$ | GPC Peak 1 $M_n$ kDa | $PDI_1$ $M_w/M_n$ | GPC Peak 2 $M_n$ kDa | $PDI_2$ $M_w/M_n$ | Percent diol purity[d] |
|---|---|---|---|---|---|---|---|---|
| 5FOx-S1-TL | 5.9 | 1.8 | 1.60 | 4.0 | 1.15 | 1.5 | 1.03 | NA |
| P[3FOx-C1][c] | 3.7 | 2.4 | 1.39 | 5.1 | 1.08 | 1.3 | 1.01 | 52 |
| P[3FOx-C1-4.5] | 4.5 | 4.3 | 1.15 | 4.5 | 1.11 | 1.3 | 1.01 | 98[g] |
| 3FOx-C1-TL | 2.7 | 1.8 | 1.30 | 3.8 | 1.10 | 1.3 | 1.02 | NA |
| P[5FOx-C1] | 6.5 | 3.6 | 1.34 | 5.3 | 1.12 | 1.5 | 1.02 | 74 |
| P[5FOx-C1-5.2] | 5.2 | 4.7 | 1.15 | 4.9 | 1.12 | 1.5 | 1.01 | 98[h] |
| 5FOx-C1-TL | 6.1 | 2.1 | 1.30 | 4.1 | 1.10 | 1.5 | 1.02 | NA |

[a] S, synthesized; 1, sample designation; S1-11, synthesized, sample 1; extracted, Mn (11 kDa).
[b] TL = top layer from extraction of P[3FOx-S1].
[c] C, commercial; 1, sample designation; C1-11, commercial, sample 1; extracted, Mn (11 kDa).
[d] Percent purity = $\dfrac{\text{Corrected RI Area}_{GPC\text{-}Peak\text{-}1}}{\text{Corrected RI Area}_{GPC\text{-}All\ Peaks}} \times 100$. The refractive index (RI) GPC signal was used for this calculation. The area RI signal was corrected based on their differences with the mobile phase.
[e] Two extractions with hexane.
[f] Two extractions with hexane/methanol.
[g] Ten extractions with hexane.
[h] Four extractions with hexane/methanol.

TABLE 2

Polyurethane characterization data.

| HMDI/BD(30) Polyurethanes | $M_w$ (kDa) | PDI | Tensile strength (MPa) | Strain/break (%) | Rugosity $(R_q)$ (nm)[a] | Contact angles (°)[b] 1st cycle $\theta_{adv}$ | 1st cycle $\theta_{rec}$ | 4th cycle $\theta_{adv}$ | 4th cycle $\theta_{rec}$ |
|---|---|---|---|---|---|---|---|---|---|
| P[3FOx—C1] | 16 | 2.7 | 4.5 | 23 | 3 | 108 | 53 | 99 | 56 |
| P[3FOx—C1-4.5] | 110 | 6.0 | 9.2 | 1245 | 17 | 107 | 56 | 106 | 54 |
| P[5FOx—C1] | 12 | 1.6 | 1.7 | 86 | 10 | 126 | 60 | 122 | 58 |
| P[5FOx—C1-5.2] | 98 | 1.9 | 4.5 | 185 | 9 | 134 | 52 | 133 | 52 |

[a] From 100 × 100 μm AFM images
[b] Dynamic contact angles (Wilhelmy plate).

TABLE 3

Hybrid coatings: reactant quantities, DSC transition temperatures, tensile testing and dynamic mechanical data.

| Designation [Example] | Mass INP 5 (g)[a] 3 | Mass INP 5 (g)[a] 4 | Mass 3F—PU 6 (g)[a] | MDSC $T_{g,sb}, T_{g,hb}$ (°C) | MDSC $T_{m,hb}$ (°C) | MDSC $\Delta H_m$ (J/g) | Tensile test Modulus (MPa) | Tensile test Strain at break (%) | DMA $T_g$ (°C) | DMA $T_m$ (°C) | Storage modulus (MPa) 0° C. | Storage modulus (MPa) 25° C. | Storage modulus (MPa) 100° C. |
|---|---|---|---|---|---|---|---|---|---|---|---|---|---|
| 3F—Si//H | | | 0 | −45, 65 | — | — | —[b] | —[b] | —[b] | —[b] | —[b] | —[b] | —[b] |
| 3F—Si/H (U-3F-10) [5] | 2 | 0.2 | 0.22 | −47, 84 | — | — | —[b] | —[b] | —[b] | —[b] | —[b] | —[b] | —[b] |
| 3F—Si/H (U-3F-30) [6] | 2.2 | 0.22 | 0.94 | −62, 102 | — | — | 0.2 | 47 | −27 | 94 | 28 | 25 | 3.9 |
| 3F—Si/H (U-3F-40) [7] | 2.2 | 0.22 | 1.46 | −45, 35 | — | — | 2.1 | 391 | −22 | — | 11 | 6.4 | 2 |
| 3F—Si/H (U-3F-50) [7] | 2.2 | 0.22 | 2.2 | −62, 36 | 117 | 0.9 | 0.94 | 463 | −29 | 115 | 14 | 9.6 | 2 |
| 3F—Si/H (U-3F-60) [8] | 2.2 | 0.22 | 3.3 | −49, 56 | 122 | 1.4 | 2.3 | 549 | −24 | 148 | 17 | 7.8 | 1.7 |
| 3F—Si/H (U-3F-75) [9] | 2 | 0.2 | 6 | −55, 52 | 118 | 1.0 | 1.2 | 574 | −27 | 142 | 16 | 7.7 | 1.5 |

TABLE 3-continued

Hybrid coatings: reactant quantities, DSC transition temperatures, tensile testing and dynamic mechanical data.

| | Mass INP 5 (g)[a] | | Mass 3F—PU 6 (g)[a] | MDSC | | | | Tensile test | | DMA | | Storage modulus (MPa) | | |
|---|---|---|---|---|---|---|---|---|---|---|---|---|---|---|
| Designation [Example] | 3 | 4 | | $T_{g,sb}, T_{g,hb}$ (°C.) | $T_{m,hb}$ (°C.) | $\Delta H_m$ (J/g) | | Modulus (MPa) | Strain at break (%) | $T_g$ (°C.) | $T_m$ (°C.) | 0° C. | 25° C. | 100° C. |
| 3F—Si/H (U-3F-90) [10] | 2.2 | 0.22 | 19.8 | −53, 44 | 119 | 3.1 | | 2.2 | 1175 | −30 | 129 | 20 | 13 | 1.6 |
| U-3F [11] | — | — | — | −35, 45 | 128 | 3.4 | | 8.4 | 1250 | — | — | — | — | — |

[a] Sufficient THF for solution.
[b] Too fragile for stress-strain tests.

TABLE 4

Mechanical and thermal properties and abhesion results of the hybrid coatings.

| Coatings | Modulus, MPa | Tensile Strength, MPa | Strain at Break, % | Glass Transition Temp, ° C. | Thermal Degradation Temp, ° C. | Abhesion Peak removal Force, MPa | Removal Energy, J/m² | Ex# |
|---|---|---|---|---|---|---|---|---|
| 3FOx-(3.6)-UUr-Si(5) | 3.2 | 1.2 | 80 | −35 | 430 | 0.074 | 9.56 | 3 |
| 3FOx-(3.6)-UUr-Si(9) | | | | | | 0.18 | 60 | 1 |
| 3FOx-(4.5)-UUr-Si(8) | | 2.1 | 400 | | | 0.18 | 85 | 5 |
| 5FOx-(4.7)-UUr-Si(8) | | | | | | 0.26 | 35.4 | 2 |
| 5FOx-(5.2)-UUr-Si(7) | 0.6 | 0.8 | 290 | | | 0.24 | 98 | 6 |
| (3FOx-b-ME2Ox)-75:25-4.7-UUr-Si(8) | 1.3 | 0.8 | 60 | | | 0.05 | 15 | 7 |

TABLE 5

Hybrid coatings: contact angles, ATR-IR normalized carbonyl peak areas and RSA-III abhesion data.

| | Contact angles (°) | | Normalized | Coating thickness | Abhesion (RSA-III) | |
|---|---|---|---|---|---|---|
| | | | | | ECR-P Peak Removal | ECR-E Removal |
| Designation | $\theta_{adv}$ | $\theta_{rec}$ | C=O peak area | (μm) | Force (MPa) | Energy (J/m²) |
| 3F—Si//H | 110 | 64 | 0.18 | 400 | 0.046 | 6.4 |
| 3F—Si/H (U-3F-10) | 108 | 55 | 0.13 | 300 | 0.093 | 17.5 |
| 3F—Si/H (U-3F-30) | 115 | 47 | 0.24 | 300 | 0.094 | 18.2 |
| 3F—Si/H (U-3F-40) | 106 | 56 | 0.29 | 300 | 0.068 | 10.3 |
| 3F—Si/H (U-3F-50) | 102 | 58 | 0.3 | 200 | 0.078 | 5.1 |
| 3F—Si/H (U-3F-60) | 103 | 56 | 0.31 | 250 | 0.14 | 37.1 |
| 3F—Si/H (U-3F-75) | 108 | 57 | 0.34 | 200 | 0.15 | 36 |
| 3F—Si/H (U-3F-90) | 112 | 51 | 0.56 | 200 | 0.46 | 133 |
| U-3F | 106 | 55 | 1 | 300 | 0.5 | 145.4 |

TABLE 6

Dynamic Contact Angle of the hybrid coatings (DCA, Wilhelmy plate).

| Coatings | $\theta_{Adv}$, ° | | | | $\theta_{Rec}$, ° | | | | Ex # |
|---|---|---|---|---|---|---|---|---|---|
| | $1^{st}$ | $2^{nd}$ | $3^{rd}$ | $4^{th}$ | $1^{st}$ | $2^{nd}$ | $3^{rd}$ | $4^{th}$ | |
| 3FOx-(3.6)-UUr-Si(5) | 111.6 | 111.1 | 109.8 | 107.9 | 47.5 | 49.0 | 50.1 | 51.4 | 3 |
| 5FOx-(4.7)-UUr-Si(8) | | | | | | | | | 2 |
| 3FOx-(3.6)-UUr-Si(9) | 113.1 | 113.4 | 112.4 | | 43.6 | 45.5 | 47.4 | | 1 |
| 3FOx-(4.5)-UUr-Si(8) | | | | | | | | | 5 |
| 5FOx-(5.2)-UUr-Si(7) | | | | | | | | | 6 |
| (3FOx-b-ME2Ox)-75:25-4.7-UUr-Si(8) | 129.5 | 100.3 | 99.6 | | 57.9 | 59.2 | 62.1 | | 7 |

TABLE 7

Diols ($R_4$) that can be used for reactions described in FIG. 14.

| Designation number | Designation | Full name | Chemical Structure |
|---|---|---|---|
| 1 | PTMO | polytetramethylene oxide diol | 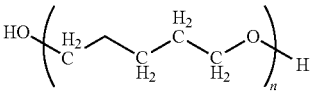 |
| 2 | 3FOx | poly(3-methyl-3-[2,2,2-trifluoroethyoxy)methyl]-1,3-oxetane) | 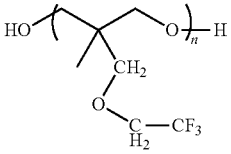 |
| 3 | 5FOx | poly(3-methyl-3-[2,2,3,3,3-pentafluoroethyoxy)methyl]-1,3-oxetane) | 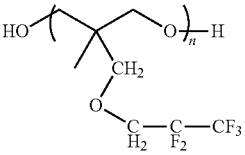 |
| 4 | 7FOx | poly(3-methyl-3-[2,2,3,3,4,4,4-heptafluoroethyoxy)methyl]-1,3-oxetane) | 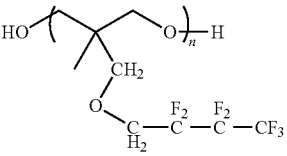 |
| 5 | nFOx | Polyoxetane with perfluorinated side chains of n fluorine atoms | 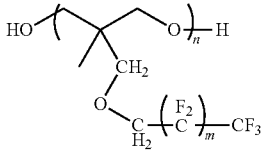<br>m = (n − 3)/2 |
| 6 | ME2Ox | poly[3-(2,5,8-trioxydodecyl)-3-methyloxetane] | 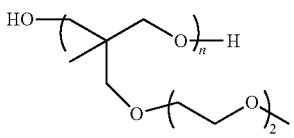 |

TABLE 7-continued

Diols ($R_A$) that can be used for reactions described in FIG. 14.

| Designation number | Designation | Full name | Chemical Structure |
|---|---|---|---|
| 7 | ME3Ox | poly[3-(2,5,8,11-tetraoxydodecyl)-3-methyloxetane] | (structure shown) |
| 8 | MEnOx | Polyoxetane diol with sides chains of n polyethylene glycol repeat units and methoxy side chain ends | (structure shown) |
| 9 | nFOx-co-MEpOx | Copolyoxetane diol with sides chains of perfluorinated side chains of n fluorine atoms and side chains with p polyethylene glycol repeat units and methoxy side chain ends | (structure shown) $m = (n - 3)/2$ |

TABLE 8

Diisocyanates ($R_B$) that can be used for reactions described in FIG. 14.

| Designation number | Designation | Name |
|---|---|---|
| 1 | $H^{12}$MDI | Methylene dicyclohexyl diisocyanate |
| 2 | MDI | Diphenylmethane diisocyanate |
| 3 | HDI | Hexamethylene diisocyanate |
| 4 | IPDI | Isophorone diisocyanate |
| 5 | TDI | Toluene diisocyanate |
| 6 | XDI | Xylylene diisocyanate |
| 7 | t-CHDI | Cyclohexane diisocyanate |
| 8 | TMXDI | Tetramethyl Xylylene diisocyanate |
| 9 | TMHDI | Trimethylhexamethylene diisocyanate |
| 10 | NBDI | Norbornane diisocyanate |
| 11 | PDI | Phenylene diisocyanate |

TABLE 9

Organosilicon compounds ($R_C$ and $R_D$) that can be used for reactions described in FIG. 14.

| | $R_C$ | | | $R_D$ | |
|---|---|---|---|---|---|
| No. | Name | Chemical Structure | No. | Name | Chemical Structure |
| 1 | Amino-ethyl- | $NH2-(CH_2)_2-$ | 1 | Methyl | $-CH_3$ |
| 2 | Amino-propyl- | $NH2-(CH_2)_3-$ | 2 | Ethyl | $-CH_2CH_3$ |
| 3 | Amino-butyl- | $NH2-(CH_2)_4-$ | 3 | Propyl | $-CH_2CH_2CH_3$ |
| 4 | Amino-pentyl- | $NH2-(CH_2)_5-$ | 4 | Butyl | $-CH_2CH_2CH_2CH_3$ |
| 5 | Amino-hexyl- | $NH2-(CH_2)_6-$ | 5 | | |

The entire contents of each of the following references is hereby independently incorporated by reference, the same as if set forth at length.

1. Park, D.; Weinman, C. J.; Finlay, J. A.; Fletcher, B. R.; Paik, M. Y.; Sundaram, H. S.; Dimitriou, M. D.; Sohn, K. E.; Callow, M. E.; Callow, J. A.; Handlin, D. L.; Willis, C. L.; Fischer, D. A.; Kramer, E. J.; Ober, C. K. Langmuir 2010, 26, 9772-9781.
2. Darrigran, G.; Damborenea, C.; Greco, N. Ambio 2007, 36, 575-579.
3. Aldridge, D. C.; Salazar, M.; Serna, A.; Cock, J. Aquaculture 2008, 281, 34-42.
4. Evans, S. M.; Leksono, T.; McKinnell, P. D. Mar. Pollut. Bull. 1995, 30, 14-21
5. Finnie, A.; Williams, D. N. In Biofouling; Durr, S., Thomason, J. C., Eds.; Wiley-Blackwell: Chichester, U.K, 2010, p 185-201.
6. Wu, S. C.; Lee, C. M. Bioresour. Technol. 2011, 102, 5375-5380.
7. Le-Clech, P. Appl. Microbiol. Biotechnol. 2010, 88, 1253-1260.
8. Durr, S.; Thomason, J. C., Biofouling Wiley-Blackwell: Chinchester, UK, 2010.
9. Swain, G. W.; Schultz, M. P. Biofouling 1996, 10, 187-197.

10. Wynne, K. J.; Swain, G. W.; Fox, R. B.; Bullock, S.; Uilk, J. Biofouling 2000, 16, 277-288.
11. Tribou, M.; Swain, G. Biofouling 2010, 26, 47-56.
12. Kendall, K. J. Physics D Applied Physics 1971, 4, 1186-1195.
13. Newby, B. M. Z.; Chaudhury, M. K.; Brown, H. R. Science 1995, 269, 1407-1409.
14. Swain, G. J. Protective Coatings and Linings 1999, 16, 26-33.
15. Kumar, A.; Gupta, R. K. Fundamentals of Polymer Engineering; Marcel Dekker: New York, 2003.
16. Tsibouklis, J.; Stone, M.; Thorpe, A. A.; Graham, P.; Peters, V.; Heerlien, R.; Smith, J. R.; Green, K. L.; Nevell, T. G. Biomaterials 1999, 20, 1229-1235.
17. Thorpe, A. A.; Peters, V.; Smith, J. R.; Nevell, T. G.; Tsibouklis, J. J. Fluorine Chem. 2000, 104, 37-45.
18. Williams, D. N.; Lines, R., A1287056B1, 2001.
19. Wynne, K. J.; Lambert, J. M. In Encyclopedia of Biomaterials and Biomedical Engineering; Wnek, G. W., Bowlin, G. B., Eds.; Marcel Dekker: New York, 2004; Vol. 1, p 1348-1362.
20. Evans, E. R., U.S. Pat. No. 4,997,289 U.S. Pat. No. 4,997,289, 1990.
21. Evans, E. R., U.S. Pat. No. 5,079,291 U.S. Pat. No. 5,079,291, 1992.
22. Gosh, N. E.; Razzano, J. S.; Wand, A., U.S. Pat. No. 7,671,161 B2 U.S. Pat. No. 7,671,161 B2 2010.
23. Yarbrough, J. C.; Rolland, J. P.; DeSimone, J. M.; Callow, M. E.; Finlay, J. A.; Callow, J. A. Macromolecules 2006, 39, 2521-2528.
24. Malik, A. A.; Archibald, T. G., U.S. Pat. No. 5,703,194, 1997.
25. Malik, A. A.; Archibald, T. G., U.S. Pat. No. 5,807,977, 1998.
26. Malik, A. A.; Carlson, R. P., U.S. Pat. No. 5,668,251, 1997.
27. Makal, U.; Uilk, J.; Kurt, P.; Cooke, R. S.; Wynne, K. J. Polymer 2005, 46, 2522-2530.
28. Saegusa, T.; Chujo, Y. Journal of Macromolecular Science-Chemistry 1990, A27, 1603-1612.
29. Adachi, K.; Achimuthu, A. K.; Chujo, Y. Macromolecules 2004, 37, 9793-9797.
30. Kurt, P.; Wynne, K. J. Macromolecules 2007, 40, 9537-9543.
31. Shin, J.; Matsushima, H.; Chan, J. W.; Hoyle, C. E. Macromolecules 2009, 42, 3294-3301.
32. Kim, Y. S.; Lee, J. S.; Ji, Q.; McGrath, J. E. Polymer 2002, 43, 7161-7170.
33. Fujiwara, T.; Wynne, K. J. Macromolecules 2004, 37, 8491-8494.
34. Wynne, K. J.; Ho, T.; Johnston, E. E.; Myers, S. A. Appl. Organomet. Chem. 1998, 12, 763-770.
35. Meuler, A. J.; Smith, J. D.; Varanasi, K. K.; Mabry, J. M.; McKiney, G. H.; Cohen, R. E. ACS Appl. Mater. Interfaces 2010, 2, 3100-3110.

This application claims priority to U.S. Provisional Application No. 61/457,977, filed Jul. 26, 2011, the entire contents of which are hereby incorporated by reference. The entire contents of U.S. Provisional Application No. 61/487,991, filed May 19, 2011, are hereby incorporated by reference.

What is claimed is:
1. A composition, comprising a polymerization product of:
(A) one or more of (A-1), (A-2), or a combination of (A-1) and (A-2),
wherein (A-1) is a mixture, comprising:
a fluorous oxetane having the formula:

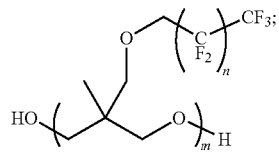

wherein n is an integer of 0-11 and m is an integer>0;
a polydispersity index, $PDI_O$ $M_w/M_n$, of 1.0-2.0; and
a percent purity of 90%-100%,
wherein (A-2) is a copolyoxetane having the formula:

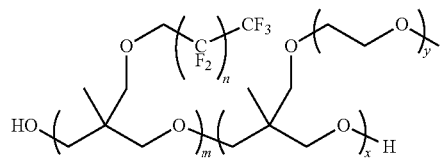

wherein n is an integer of 0-11, and m is an integer>0; and
wherein y is an integer of 0-11, and x is an integer>0; and
(B) an isocyanate having the formula:

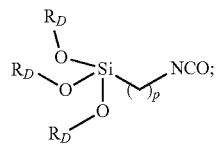

wherein $R_D$ is —$CH_3$, —$CH_2CH_3$, —$CH_2CH_2CH_3$, —$CH_2CH_2CH_2CH_3$;
and p is an integer of 1-10;
and
(C) optionally, a diol or diamine chain extender.
2. The composition of claim 1, wherein (A) is the mixture.
3. The composition of claim 1, wherein (A) is the copolyoxetane.
4. A method for making the composition of claim 1, comprising contacting (A), (B), and optionally (C), and polymerizing, to produce the composition of claim 1.
5. A composition, comprising a polymerization product of:
(A) one or more of (A-1), (A-2), or a combination of (A-1) and (A-2),
wherein (A-1) is a mixture, comprising:
a fluorous oxetane having the formula:

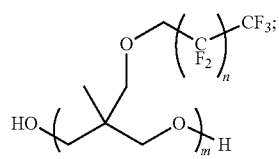

wherein n is an integer of 0-11, and m is an integer>0;

a polydispersity index, $PDI_O$ $M_w/M_n$, of 1.0-2.0; and
a percent purity of 90%-100%,
wherein (A-2) is a copolyoxetane having the formula:

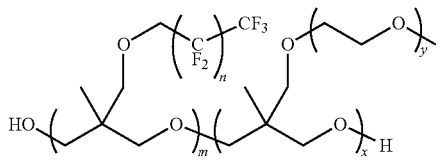

wherein n is an integer of 0-11, and m is an integer>0; and
wherein y is an integer of 0-11, and x is an integer>0; and (B) a diisocyanate and one or more amines having the formula:

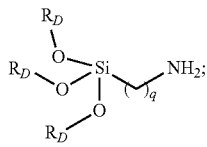

wherein $R_D$ is —$CH_3$, —$CH_2CH_3$, —$CH_2CH_2CH_3$, —$CH_2CH_2CH_2CH_3$;
and q is an integer of 1-10; and (C) optionally, a diol or diamine chain extender.

6. The composition of claim 5, wherein the diisocyanate is methylene dicyclohexyl diisocyanate, diphenylmethane diisocyanate, hexamethylene diisocyanate, isophorone diisocyanate, toluene diisocyanate, xylylene diisocyanate, cyclohexane diisocyanate, tetramethyl xylylene diisocyanate, trimethylhexamethylene diisocyanate, norbornane diisocyanate, phenylene diisocyanate, or a combination of two or more thereof.

7. A coated surface, comprising the cured polymerization product of claim 5 in contact with a surface.

8. A method for making the composition of claim 5, comprising:

contacting:
(a1) a mixture comprising a fluorous oxetane having the formula:

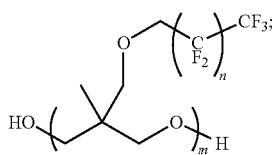

wherein n is an integer of 0-11, and m is an integer>0;
a polydispersity index, $PDI_O$ $M_w/M_n$, of 1.0-2.0; and
a percent purity of 90%-100%;

(a2) a copolyoxetane having the formula:

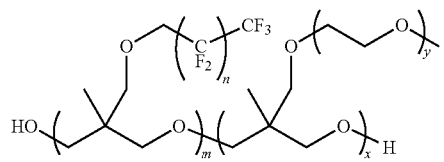

wherein n is an integer of 0-11, and m is an integer>0; and
wherein y is an integer of 0-11, and x is an integer>0;

or (a3) a combination of (a1) and (a2); and
(b1) one or more diisocyanate; and
(c1) optionally, a diol or diamine chain extender;

and polymerizing, to produce a first polymerization product;

contacting the first polymerization product with one or more amines having the formula:

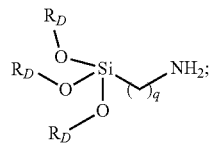

wherein $R_D$ is —$CH_3$, —$CH_2CH_3$, —$CH_2CH_2CH_3$, —$CH_2CH_2CH_2CH_3$; and
wherein q is an integer of 1-10;
and reacting,
to produce the composition of claim 5.

9. A composition for coating, comprising a compound having the formula:

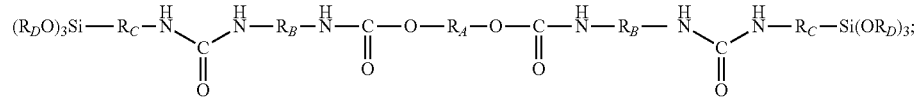

and optionally a solvent;
wherein —O—$R_A$—O— is derived from a fluorous oxetane having the formula:

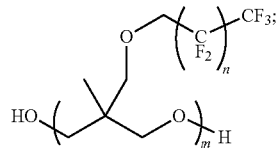

wherein n is an integer of 0-11, and m is an integer>0;

or a copolyoxetane having the formula:

[chemical structure]

wherein n is an integer of 0-11, and m is an integer>0; and wherein y is an integer of 0-11, and x is an integer>0;

wherein —(C=O)NH—$R_B$—NH(C=O)— is derived from methylene dicyclohexyl diisocyanate, diphenylmethane diisocyanate, hexamethylene diisocyanate, isophorone diisocyanate, toluene diisocyanate, xylylene diisocyanate, cyclohexane diisocyanate, tetramethyl xylylene diisocyanate, trimethylhexamethylene diisocyanate, norbornane diisocyanate, phenylene diisocyanate, or a combination of two or more thereof;

wherein $R_c$ is a $C_{1-10}$ alkylene; and wherein $R_D$ is —$CH_3$, —$CH_2CH_3$, —$CH_2CH_2CH_3$, —$CH_2CH_2CH_2CH_3$.

10. A method, comprising applying the composition of claim 9 to a surface, and allowing to cure, to produce a coated surface.

11. A coating, comprising a compound having the formula:

[chemical structure]

in contact with a surface;

wherein —O—$R_A$—O— is derived from a fluorous oxetane having the formula:

[chemical structure]

wherein n is an integer of 0-11, and m is an integer>0;

or a copolyoxetane having the formula:

[chemical structure]

wherein n is an integer of 0-11, and m is an integer>0; and wherein y is an integer of 0-11, and x is an integer>0;

wherein —(C=O)NH—$R_B$—NH(C=O)— is derived from methylene dicyclohexyl diisocyanate, diphenylmethane diisocyanate, hexamethylene diisocyanate, isophorone diisocyanate, toluene diisocyanate, xylylene diisocyanate, cyclohexane diisocyanate, tetramethyl xylylene diisocyanate, trimethylhexamethylene diisocyanate, norbornane diisocyanate, phenylene diisocyanate, or a combination of two or more thereof;

wherein $R_c$ is a $C_{1-10}$ alkylene; and wherein each Z is independently $SiO_{1.5}$ or H.

12. An article selected from the group consisting of an airfoil, wing, propeller, hull, superstructure, railing, intake, hatch, keel, rudder, deck, antenna, medical device, kitchen device, counter, pipe, wind turbine, aircraft, ship, rotor blade, transmission tower, transmission line, cable, cooling coil, refrigerator, freezer, and combination thereof, comprising the coating of claim 11.

13. A composition, comprising a polymerization product of:

first and second compositions, wherein the first composition comprises a polymerization product of:

(A) one or more of (A-1), (A-2), or a combination of (A-1) and (A-2), wherein (A-1) is a mixture, comprising:

a fluorous oxetane having the formula:

[chemical structure]

wherein n is an integer of 0-11, and m is an integer>0;

a polydispersity index, $PDI_O$ $M_w/M_n$, of 1.0-2.0; and a percent purity of 90%-100%, wherein (A-2) is a copolyoxetane having the formula:

[chemical structure]

wherein n is an integer of 0-11, and m is an integer>0; and wherein y is an integer of 0-11, and x is an integer>0;

(B) one or more of an isocyanate, diisocyanate, or combination thereof; and
(C) optionally, a diol or diamine chain extender;
and wherein the second composition comprises
one or more bis(trialkoxysilyl)alkanes having the formula:

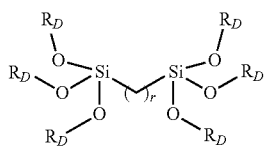

wherein $R_D$ is —$CH_3$, —$CH_2CH_3$, —$CH_2CH_2CH_3$, —$CH_2CH_2CH_2CH_3$; and
wherein r is an integer of 1-10.

14. A composition, comprising a polymerization product of:
the composition of claim 13; and
a composition comprising a polymerization product of:
(A1) a mixture, comprising:
a fluorous oxetane having the formula:

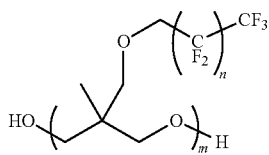

wherein n is an integer of 0-11, and m is an integer>0;
a polydispersity index, $PDI_O$ $M_w/M_n$, of 1.0-2.0; and
a percent purity of 90%-100%;
(A2) a copolyoxetane having the formula:

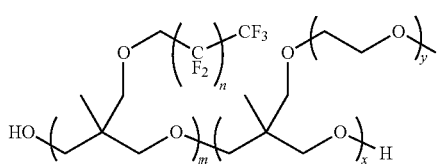

wherein n is an integer of 0-11, and m is an integer>0; and
wherein y is an integer of 0-11, and x is an integer>0;
or
(A3) a combination of the mixture (A1) and copolyoxetane (A2); and
(B) one or more of an isocyanate, diisocyanate, or combination thereof; and
(C) optionally, a diol or diamine chain extender.

15. A method for making the composition of claim 13, comprising:
contacting:
(a1) a mixture comprising a fluorous oxetane having the formula:

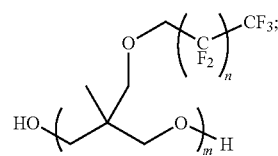

wherein n is an integer of 0-11, and m is an integer>0;
a polydispersity index, $PDI_O$ $M_w/M_n$, of 1.0-2.0; and
a percent purity of 90%-100%;
(a2) a copolyoxetane having the formula:

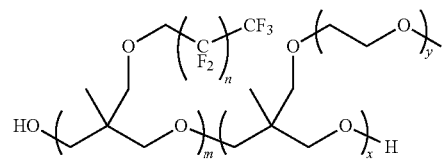

wherein n is an integer of 0-11, and m is an integer>0; and
wherein y is an integer of 0-11, and x is an integer>0;
or
(a3) a combination of (a1) and (a2); and
(b1) one or more of an isocyanate, diisocyanate, or combination thereof; and
(c1) optionally, a diol or diamine chain extender;
and polymerizing, to produce a first polymerization product;
contacting the first polymerization product with one or more bis(trialkoxysilyl)alkanes having the formula:

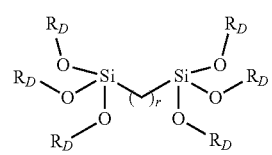

wherein $R_D$ is —$CH_3$, —$CH_2CH_3$, —$CH_2CH_2CH_3$, —$CH_2CH_2CH_2CH_3$; and
wherein r is an integer of 1-10;
and reacting,
to produce the composition of claim 13.

16. A method for making the composition of claim 14, comprising:
contacting:
(a1) a mixture comprising a fluorous oxetane having the formula:

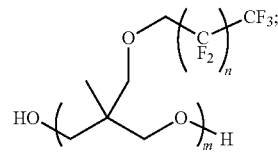

wherein n is an integer of 0-11, and m is an integer>0;
a polydispersity index, $PDI_O$ $M_w/M_n$, of 1.0-2.0; and
a percent purity of 90%-100%;

(a2) a copolyoxetane having the formula:

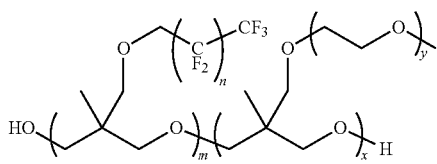

wherein n is an integer of 0-11, and m is an integer>0; and wherein y is an integer of 0-11, and x is an integer>0;

or (a3) a combination of (a1) and (a2); and (b1) one or more of an isocyanate, diisocyanate, or combination thereof; and (c1) optionally, a diol or diamine chain extender;

and polymerizing, to produce a first polymerization product;

contacting the first polymerization product with one or more bis(trialkoxysilyl)alkanes having the formula:

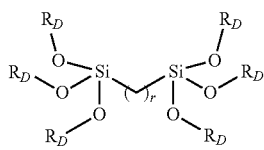

wherein $R_D$ is —$CH_3$, —$CH_2CH_3$, —$CH_2CH_2CH_3$, —$CH_2CH_2CH_2CH_3$; and wherein r is an integer of 1-10;

and reacting, to produce a second polymerization product;

contacting the second polymerization product with:

(a1) a mixture comprising a fluorous oxetane having the formula:

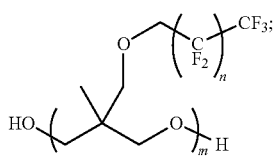

wherein n is an integer of 0-11, and m is an integer>0;

a polydispersity index, $PDI_O$ $M_w/M_n$, of 1.0-2.0; and a percent purity of 90%-100%;

(a2) a copolyoxetane having the formula:

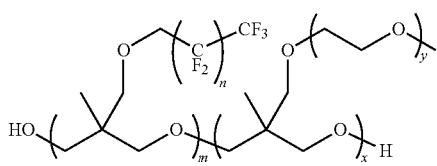

wherein n is an integer of 0-11, and m is an integer>0; and wherein y is an integer of 0-11, and x is an integer>0;

or (a3) a combination of (a1) and (a2); and (b1) one or more of an isocyanate, diisocyanate, or combination thereof; and (c1) optionally, a diol or diamine chain extender;

and polymerizing, to produce the composition of claim 14.

17. A coated surface, comprising the cured polymerization product of claim 14 in contact with a surface.

18. A composition for coating, comprising the composition of claim 14 and a solvent.

19. A method, comprising applying the composition of claim 18 to a surface, and allowing to cure, to produce a coated surface.

20. An article selected from the group consisting of an airfoil, wing, propeller, hull, superstructure, railing, intake, hatch, keel, rudder, deck, antenna, medical device, kitchen device, counter, pipe, wind turbine, aircraft, ship, rotor blade, transmission tower, transmission line, cable, cooling coil, refrigerator, freezer, and combination thereof, comprising the cured polymerization product of claim 14 on a surface thereof.

21. The composition of claim 13, wherein the diisocyanate is methylene dicyclohexyl diisocyanate, diphenylmethane diisocyanate, hexamethylene diisocyanate, isophorone diisocyanate, toluene diisocyanate, xylylene diisocyanate, cyclohexane diisocyanate, tetramethyl xylylene diisocyanate, trimethylhexamethylene diisocyanate, norbornane diisocyanate, phenylene diisocyanate, or a combination of two or more thereof.

22. The composition of claim 13, wherein (B) is a diisocyanate and further comprises one or more amines having the formula:

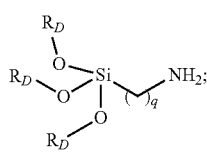

wherein $R_D$ is —$CH_3$, —$CH_2CH_3$, —$CH_2CH_2CH_3$, —$CH_2CH_2CH_2CH_3$;

and q is an integer of 1-10.

23. The composition of claim 13, wherein (B) is an isocyanate having the formula:

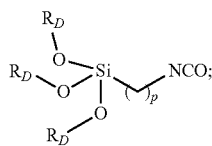

wherein $R_D$ is —$CH_3$, —$CH_2CH_3$, —$CH_2CH_2CH_3$, —$CH_2CH_2CH_2CH_3$;

and p is an integer of 1-10.

24. The composition of claim 13, wherein diol or diamine chain extender (C) is present and is selected from the group consisting of $C_{1-10}$ alkylene diol, $C_{1-10}$ alkenylene diol, $C_{1-20}$ aralkylene diol, 1,4-butanediol, $C_{1-10}$ alkylene diamine, $C_{1-10}$ alkenylene diamine, and $C_{1-20}$ aralkylene diamine.

25. The composition of claim 13, further comprising a linear polyurethane.

26. A composition for coating, comprising the composition of claim 25 and a solvent.

27. A coating, comprising the composition of claim 25.

28. An article selected from the group consisting of an airfoil, wing, propeller, hull, superstructure, railing, intake, hatch, keel, rudder, deck, antenna, medical device, kitchen device, counter, pipe, wind turbine, aircraft, ship, rotor blade, transmission tower, transmission line, cable, cooling coil, refrigerator, freezer, and combination thereof, comprising the coating of claim 27 on a surface thereof.

29. A monolithic, self-stratifying polymer coating, comprising:
  inner and outermost surfaces on opposite sides of the coating, the inner surface being in contact with and adhered to an article;
  a surface region, extending from the outermost surface to a depth of about 2 nm from the outermost surface;
  a middle region, extending from a depth of about 2 nm from the outermost surface to a depth of less than about 2000 nm from the outermost surface; and
  a bulk region, extending from a depth of less than about 2000 nm from the outermost surface to the inner surface;
  wherein the surface region comprises a fluorous polyoxetane having the formula:

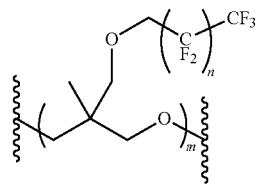

wherein n is an integer of 0-11, and m is an integer>0, in a greater concentration relative to the middle and bulk regions;
  wherein the middle region comprises —$SiO_{1.5}$ in a greater concentration relative to the surface and bulk regions;
  and wherein the bulk region comprises a polyurethane in a greater concentration relative to the surface and middle regions.

30. The coating of claim 29, wherein the article is selected from the group consisting of an airfoil, wing, propeller, hull, superstructure, railing, intake, hatch, keel, rudder, deck, antenna, medical device, kitchen device, counter, pipe, wind turbine, aircraft, ship, rotor blade, transmission tower, transmission line, cable, cooling coil, refrigerator, freezer, and combination thereof.

* * * * *